United States Patent
Jung et al.

(10) Patent No.: US 10,929,834 B2
(45) Date of Patent: Feb. 23, 2021

(54) SMART BOX AND METHOD OF USE THEREOF

(71) Applicant: Rebound International, LLC, Houston, TX (US)

(72) Inventors: David Jung, Conroe, TX (US); Yongbo Zhang, Beijing (CN)

(73) Assignee: Rebound International, LLC, Houston, TX (US)

( * ) Notice: Subject to any disclaimer, the term of this patent is extended or adjusted under 35 U.S.C. 154(b) by 0 days.

(21) Appl. No.: 16/180,727

(22) Filed: Nov. 5, 2018

(65) Prior Publication Data
US 2020/0143359 A1 May 7, 2020

(51) Int. Cl.
| | |
|---|---|
| *G06Q 20/00* | (2012.01) |
| *G06Q 20/32* | (2012.01) |
| *G06Q 30/06* | (2012.01) |
| *G06Q 20/40* | (2012.01) |
| *G06Q 20/14* | (2012.01) |

(52) U.S. Cl.
CPC ......... *G06Q 20/3278* (2013.01); *G06Q 20/14* (2013.01); *G06Q 20/40* (2013.01); *G06Q 30/0609* (2013.01); *G06Q 30/0641* (2013.01)

(58) Field of Classification Search
CPC ..... G06Q 20/14; G06Q 20/40; G06Q 20/3278
USPC ...................................................... 705/16, 17
See application file for complete search history.

(56) References Cited

U.S. PATENT DOCUMENTS

| | | | |
|---|---|---|---|
| 2006/0049250 A1* | 3/2006 | Sullivan ............... | G06K 7/0008 235/385 |
| 2017/0111519 A1* | 4/2017 | Lindoff ............... | H04L 12/1432 |
| 2018/0046978 A1* | 2/2018 | Tartal ..................... | G07D 11/14 |

\* cited by examiner

*Primary Examiner* — Rokib Masud
(74) *Attorney, Agent, or Firm* — Spradley PLLC; Michael Spradley

(57) ABSTRACT

This disclosure relates to a smart box and method of use thereof. The smart box can comprise a box, a radio-frequency identification (RFID) reader, an access control system, and a smart box control system. The box can be capable of housing a plurality of purchasable products. The RFID reader can be capable of reading a plurality of RFID tags. The smart box control system can comprise a smart box memory and a smart box processor. The smart box memory can comprise a smart box application. The smart box processor can, according to instructions from the smart box application, grant access to a buyer upon the buyer supplying an access key to the access control system, can maintain contact with each of the plurality of RFID tags within the box and can direct a purchasable product of the plurality of purchasable products to be billed to a user account.

15 Claims, 31 Drawing Sheets

| | | | | ☑ Notification  1-800-GO-SMART  &Vince Vendor |
| --- | --- | --- | --- | --- |
| GO | | Home \| My Orders\| My Reports\| My Parts\| | | 🔍 Please enter keyword   Search |

My Reports

Total: $1055
Outstanding: $855
Paid: $200
Date/Time:  03/20/18 ▽   03/20/18 ▽

| Time | | Sum | Status | |
| --- | --- | --- | --- | --- |
| 3/20/18 | | $695 | Outstanding | ▽ |
| Order Number :591 Valve Oil Cover Threaded TSC | Paul Pusher | | | Total $310 |
| Order Number :591 Chrome liners | Paul Pusher | | | Total $50 |
| Order Number :592 Product Name | Sam Supervisor | | | Total $380 |
| | More Details | | | |
| 3/20/18 | Peter Pusher  $150 | | Outstanding | ▽ |
| 3/20/18 | Pat Pusher   $10 | | Paid | ▽ |

GO | Home | My Orders | My Reports | My Rig | My Cart

✉ Notification 1-800-GO-SMART    & Paul Pusher

🔍 Please enter keyword | Search

Complete The Order

Information

Your name: Paul Pusher
Contact Number: 13899990000
E-mail: paul_pusher@myemail.com
Payment Option: Please Choose ▽
Billing Address enter add 1
123 Rig Street, Houston, Texas, 77057
Shipping Address enter add 1
123 Rig Street, Houston, Texas, 77057

— 1205

Requested Products

Vince Vendor

| | Cover, Valve pot | $425 | 1 |
| | Guide, Upper Valve | $225 | 1 |

Shipping $XX

Vlad Vendor

| | Clip, Locking (For Lower Valve guide) | $10 | 1 |

Shipping $XX

Total $655 | Submit

|Home| My Orders |My Reports| My Rigs | My Cart |   ✉ Notification  1-800-GO-SMART  👤 Sam Supervisor 🔍 Please enter keyword    | Search |

My Reports

Total: $1295
Outstanding: $695
Paid: $600
Time:  | 03/20/18 ▽ |   | 03/20/18 ▽ |

| Time | Sum | Status |
|---|---|---|
| 3/20/18 | $695 | Outstanding ▽ |
| Order Number :591 Paul Pusher Product Name | | Total $175 |
| Order Number :591 Paul Pusher Product Name | | Total $275 |
| Order Number :592 Sam Supervisor Product Name | | Total $150 |
| 3/20/18 | $600 | Paid ▽ |

Provide a graphical user interface (GUI) to a user wherein GUI can comprise a plurality of depictions (1108) of a rig (1503). Each depiction (1108) can comprise one or more clickable rig parts (511) wherein each of clickable rig parts (511) can be linked to a further depiction of said plurality of depictions (1108) or one of a plurality of purchasable components (603) represented by clickable rig part (511).

allow a buyer to select a purchasable component (603) of one of a plurality of purchasable component (603) by navigating GUI by clicking clickable rig parts (511)

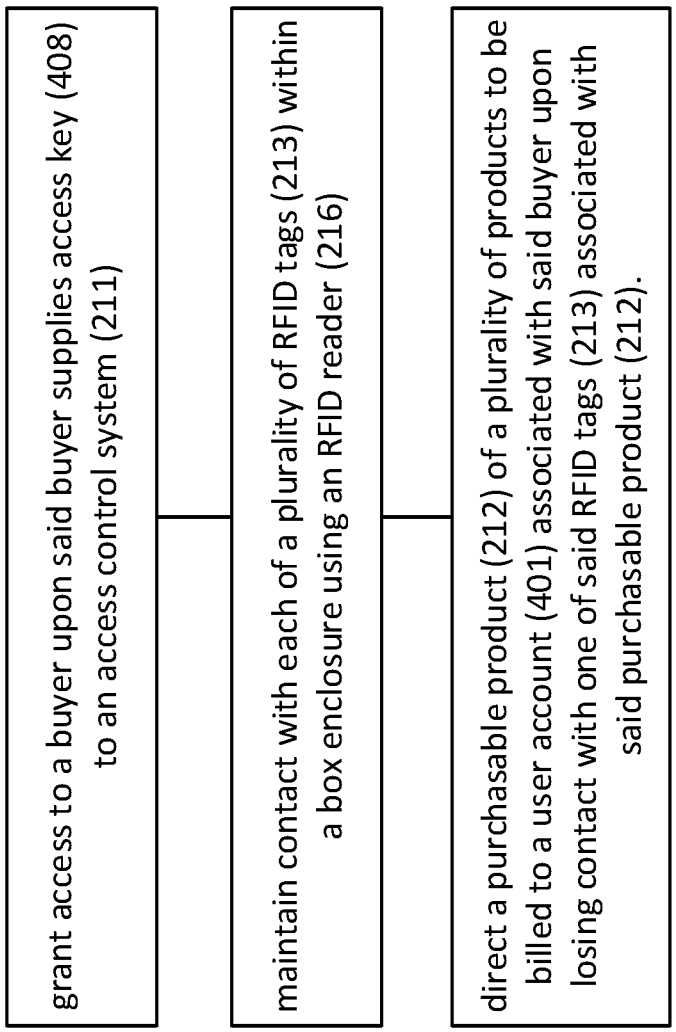

SMART BOX AND METHOD OF USE THEREOF

BACKGROUND

This disclosure relates to a smart box and method of use thereof. An operational drilling rig contains many parts to function. When a part breaks or malfunctions, the rig can become unsafe or inoperable. Either way, the rig is crippled, and significant economic losses result each minute the rig is inoperable. Methods for purchasing drilling rig parts and equipment have evolved over the years. More recently, rig parts and other equipment can be ordered online. However, even under the best conditions, only some parts could be overnighted. However, larger parts coming from far away could take significantly longer, resulting in significant losses in revenue. Reducing downtime through improved supply-chain management technology can reduce such losses. As such it would be useful to have a smart box for providing an MRO solution for drilling rig sites.

SUMMARY

This disclosure relates to a smart box and method of use thereof. The smart box can comprise a box, a radio-frequency identification (RFID) reader, an access control system, and a smart box control system. The box can be capable of housing a plurality of purchasable products. The RFID reader can be capable of reading a plurality of RFID tags. The smart box control system can comprise a smart box memory and a smart box processor. The smart box memory can comprise a smart box application. The smart box processor can, according to instructions from the smart box application, grant access to a buyer upon the buyer supplying an access key to the access control system. Additionally according to the instructions from smart box application, the smart box processor can maintain contact with each of the plurality of RFID tags within the box using the RFID reader and can direct a purchasable product of the plurality of purchasable products to be billed to a user account associated with the buyer upon losing contact with an RFID tag of the plurality of RFID tags associated with the purchasable product.

In another embodiment a method of using a smart box is disclosed herein. The method can comprise the step of granting access to a buyer to the smart box upon the buyer supplying an access key to an access control system. The smart box can comprise can comprise a box, a radio-frequency identification (RFID) reader, an access control system, a smart box memory, and a smart box processor. The box can be capable of housing a plurality of purchasable products. The RFID reader can be capable of reading a plurality of RFID tags. The smart box memory can comprise a smart box application. The method can also comprise the steps of maintaining contact with each of the plurality of RFID tags within the box using the RFID reader and directing a purchasable product of the plurality of purchasable products to be billed to a user account associated with the buyer upon losing contact with one of the RFID tag associated with the purchasable product.

Lastly, in another embodiment, a computer readable storage medium having data stored therein can represent software executable by a computer. The software can include instructions to provide a maintenance, repair, and operating supplies (MRO) solution for drilling rig sites can comprise the storage medium. The storage medium can comprise instructions of the above-mentioned methods.

BRIEF DESCRIPTION OF THE DRAWINGS

FIG. 9 illustrates a vendor's my-order page.
FIG. 10 illustrates a vendor's my-reports page.
FIG. 12A illustrates a my-cart screen.
FIG. 12B illustrates a complete-the-order screen.
FIG. 14 illustrates a buyer my-orders screen.
FIG. 17 illustrates a buyer my-reports screen.
FIG. 21 illustrates an exemplary method for providing a maintenance, repair, and operating supplies solution for drilling rig sites.
FIG. 22 illustrates an exemplary method for granting access to a plurality of products within a smart box control system.

DETAILED DESCRIPTION

Described herein is a smart box and method of use thereof. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure.

Accordingly, the claims appended hereto are not intended to be limited by the disclosed embodiments, but are to be accorded their widest scope consistent with the principles and features disclosed herein.

Figure 1:
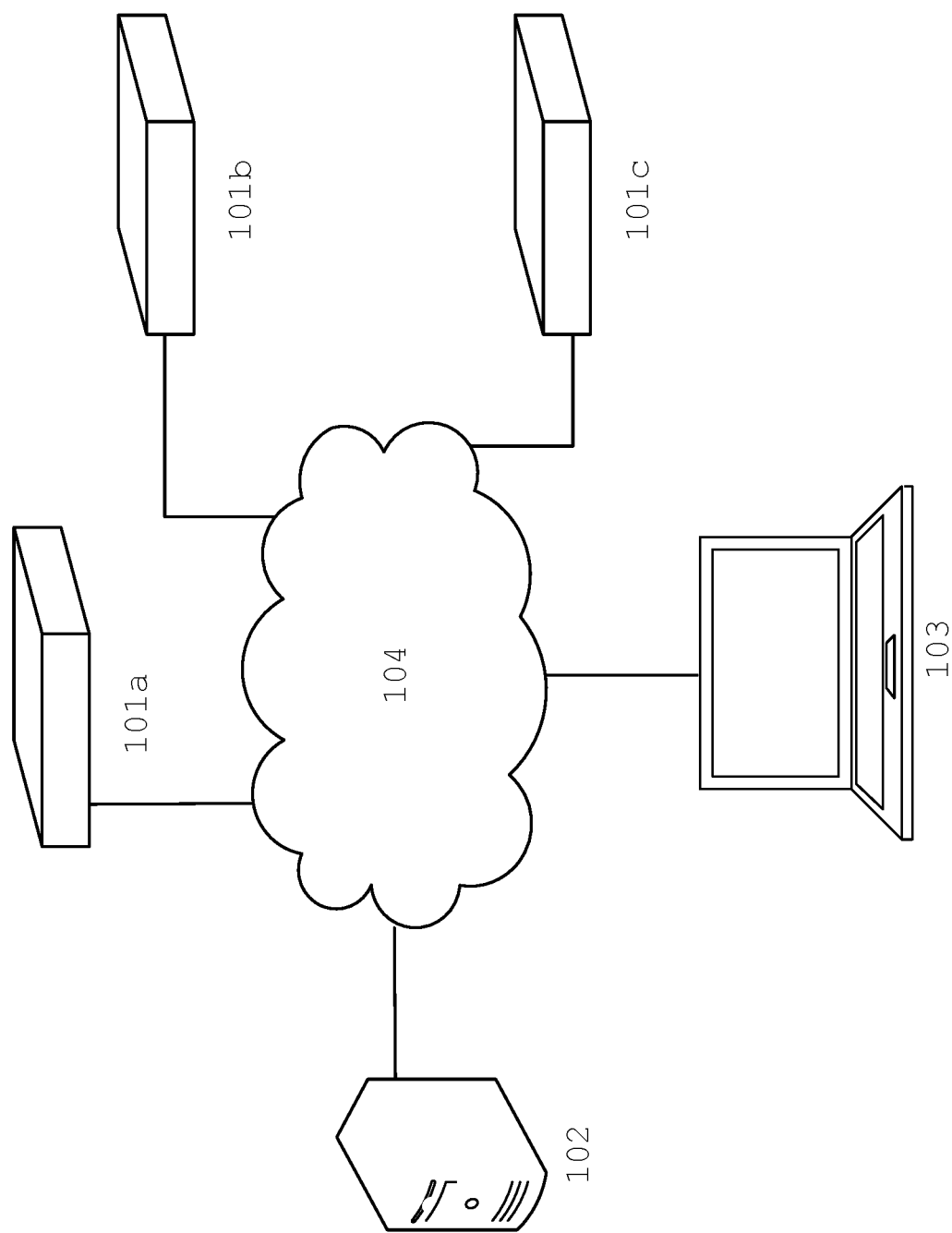
FIG. 1 illustrates a smart MRO (maintenance, repair, and operating supplies) solutions system.

FIG. 1 illustrates a smart MRO (maintenance, repair, and operating supplies) solutions system 100 comprising one or more smart box control systems 101, one or more servers 102, and one or more computers 103 connected via a network 104. For purpose of this disclosure, each smart box control system 101 is control system that controls a secured container, i.e., a smart box, used to store drilling rig replacement parts. In one embodiment, each smart box control systems 101 can be mobile. In such embodiment, smart control box systems 101 can be picked up from one location and be placed in another location. Moreover, smart box control systems 101 can dispense supplies according to instructions received from servers 102, as will be discussed further below. In such embodiment, smart box control systems 101 can send and receive data to and from servers 102 over network 104. Moreover, smart box control systems 101 can carry out arithmetic and logic operations. Servers 102 represents at least one, but can be many servers, each connected to network 104 capable of performing computational task, and storing data information. Servers 102 can be accessible to an individual or an institution through a web browser that can provide an MRO solution. Each computer 103 can be a desktop computer, laptop, tablet, or smartphone capable of receiving, storing, and sending out data information through network 104. Network 104 can be a local area network (LAN), a wide area network (WAN), a piconet, or a combination of LANs, WANs, or piconets. One illustrative LAN is a network within a single business. One illustrative WAN is the Internet. In the preferred embodiment, network 104 can comprise the Internet.

Figure 2A:
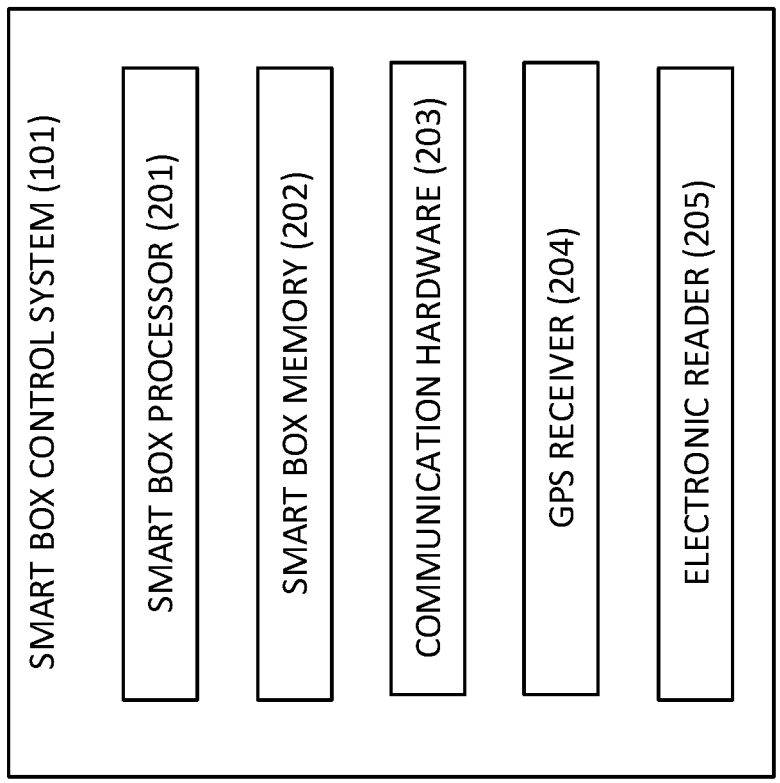
FIG. 2A illustrates an internal hardware of a smart box control system.

FIG. 2A illustrates an internal hardware of smart box control system 101 comprising a smart box processor 201, a smart box memory 202, and communication hardware 203. Smart box processor 201 can be a device that executes programs stored in smart box memory 202. Smart box memory 202 can be a physical device used to store programs and/or data. Communication hardware 203 can include a network transport processor for packetizing data, communication ports for wired communication, or an antenna for wireless communication. Processes can include storing input data to device smart box memory 202, verifying input data is valid and conforms to preset standards, or ensuring all required data. Input data can be sent to communication hardware 203 for communication over network 104. In one embodiment, smart box control system 101 can further comprise a GPS receiver 204, which can determine location of smart box control system 101 using methods commonly known in the art. In one embodiment, smart box control system 101 can further comprise an electronic reader 205 or a scanner. Electronic reader 205 can be capable of scanning machine-readable codes such as Quick Response (QR) codes, or Universal Product Codes (UPC). In one embodiment, electronic reader 205 can be a barcode reader such as QR scanner, and UPC scanner. In another embodiment, electronic reader 205 can be a biometric reader. In such embodiment, electronic reader 205 can be capable of reading biometric data such as fingerprints, and facial images.

Figure 2B:
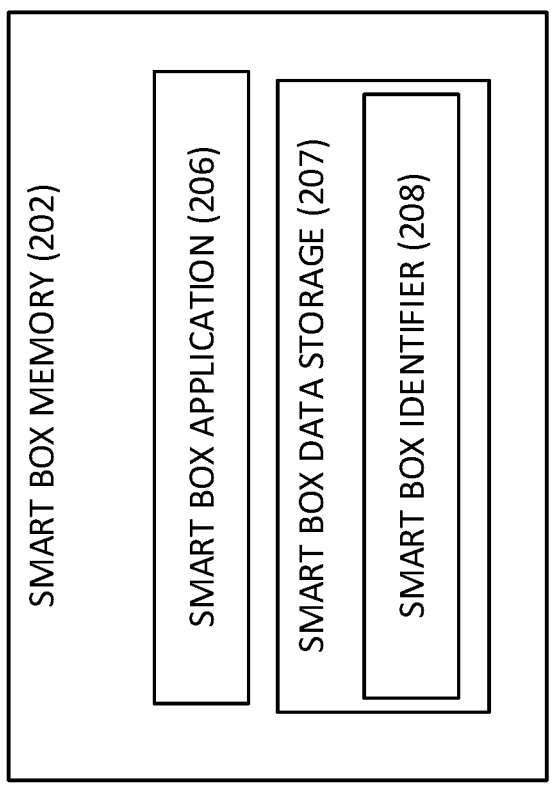
FIG. 2B illustrates a smart box control system memory comprising smart box application and smart box data storage.

FIG. 2B illustrates a smart box memory 202 comprising a smart box application 206 and smart box data storage 207. Smart box application 206 can reside and perform logical functions within smart box memory 202. Smart box application 206 can receive and transmit sets of instructions and data information across network 104. Smart box data storage 207 can be a component in smart box memory 202 that can be used to retain digital data. In one embodiment, smart box data storage 207 can comprise a smart box identifier 208. Smart box identifier 208 can be a unique code that represents each smart box control system 101 in a smart solutions system 100. Further, smart box processor 201 can perform processes on the data according to smart box application 206 stored in smart box memory 202. Processes can include storing input data in smart box data storage 207. Input data can be sent to communication hardware 203 and then over network 104.

Figure 2C:
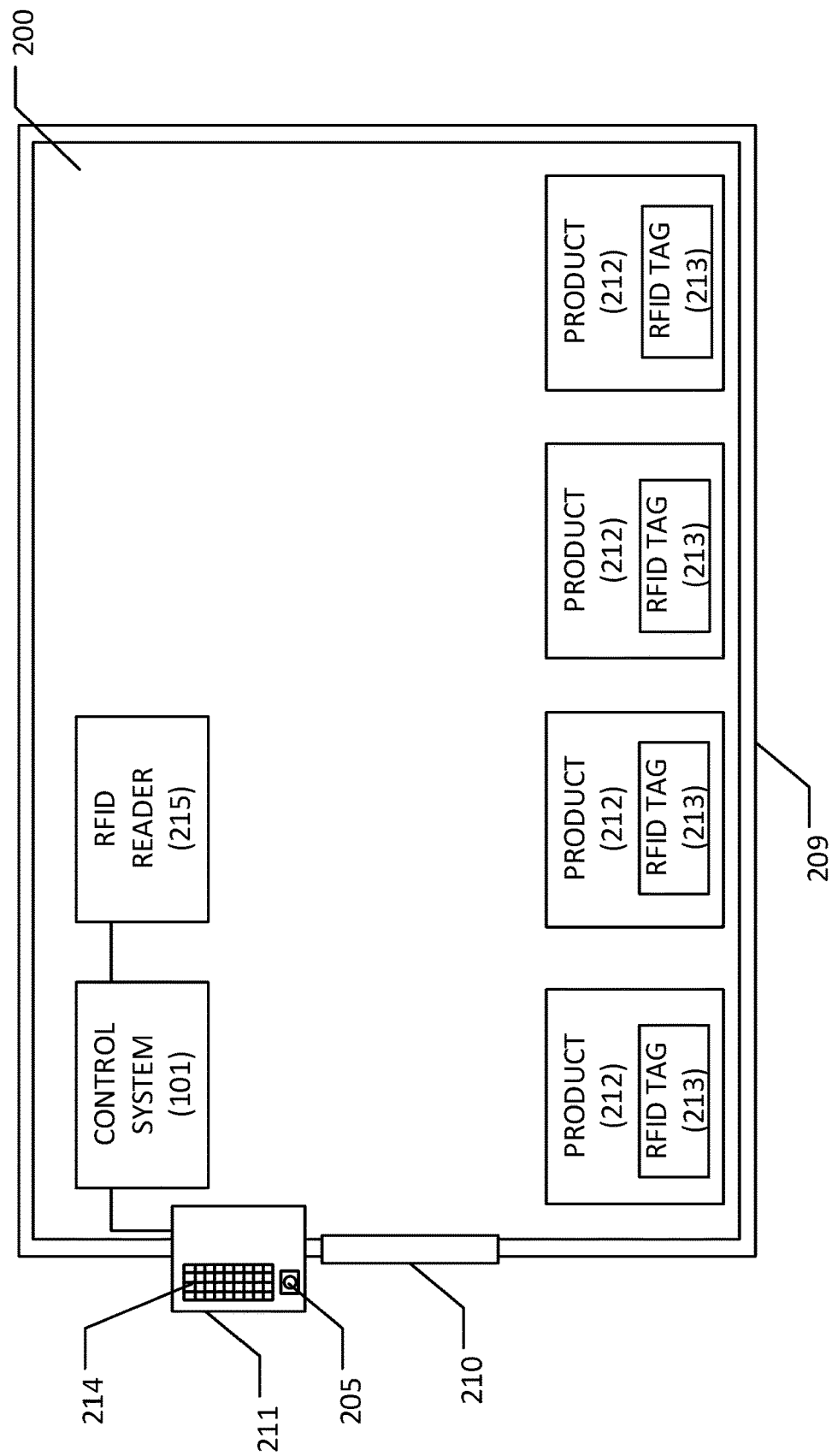
FIG. 2C illustrates an embodiment of a smart box.

FIG. 2C illustrates an embodiment of a smart box 200. Smart box 200 can be a box container comprising a wall 209, and a door 210. In this structure, wall 209 can securely enclosed a plurality of products 212 within smart box 200, while door 210 can be an electronically controlled opening wherein products 212 can be accessed. In one embodiment, wall 209 and door 210 can be made of durable material such as metal. In such embodiment, each product 212 can comprise radio frequency identification (RFID) tag 213. RFID tag 213 can allow each product 212 be identified and tracked within smart box control system 101. As such, RFID tag 213 can comprise information on products 212, such as component name, manufacturer, etc. Furthermore, smart box 200 can be strategically placed near a drilling rig for fast retrieval of ordered product supplies. In one embodiment, smart box 200 can comprise a GPS device that can be capable of receiving GPS data from GPS satellite, which can then calculate smart box 200 geographical position. In such embodiment, GPS receiver 204 can attach within smart box 200.

Further in this embodiment, smart box 200 can comprise control system 101. In one embodiment, control system 101 can comprise access control system 211, and an RFID reader 215. In one embodiment, access control system 211 can be a device, such as an electric lock, installed at the outer surface of smart box 200. In such embodiment, access control system 211 can comprise of electronic reader 205, and/or a keypad 214 that can allow an individual to enter an input data on control system 101 before granting access to products 212 within smart box 200. For purposes of this disclosure, input data can be a keyed-in alphanumeric character, or a machine-readable code entered on smart box control system 101 through access control system 211.

Further in one embodiment, control system 101 can be capable of comparing the input data entered through access control system 211 with an access control list from server 102. In such embodiment, control system 101 can grant or deny access to products 212 according to the results of the comparison between the input data and the access control list, which can further be discussed below. In one embodiment, RFID reader 215 can be placed within smart box 200 and can be connected to control system 101. As such, control system 101 can instruct RFID reader 215 to maintain contact with each RFID tag 213 within smart box 200. RFID reader 215 can maintain contact with each RFID tag 213 by scanning and gathering information from RFID tags 213 of products 212 and sending the signal back to control system 101. This feature can allow smart box control system 101 to monitor products 212 claimed by individuals on smart box 200.

Figure 3:
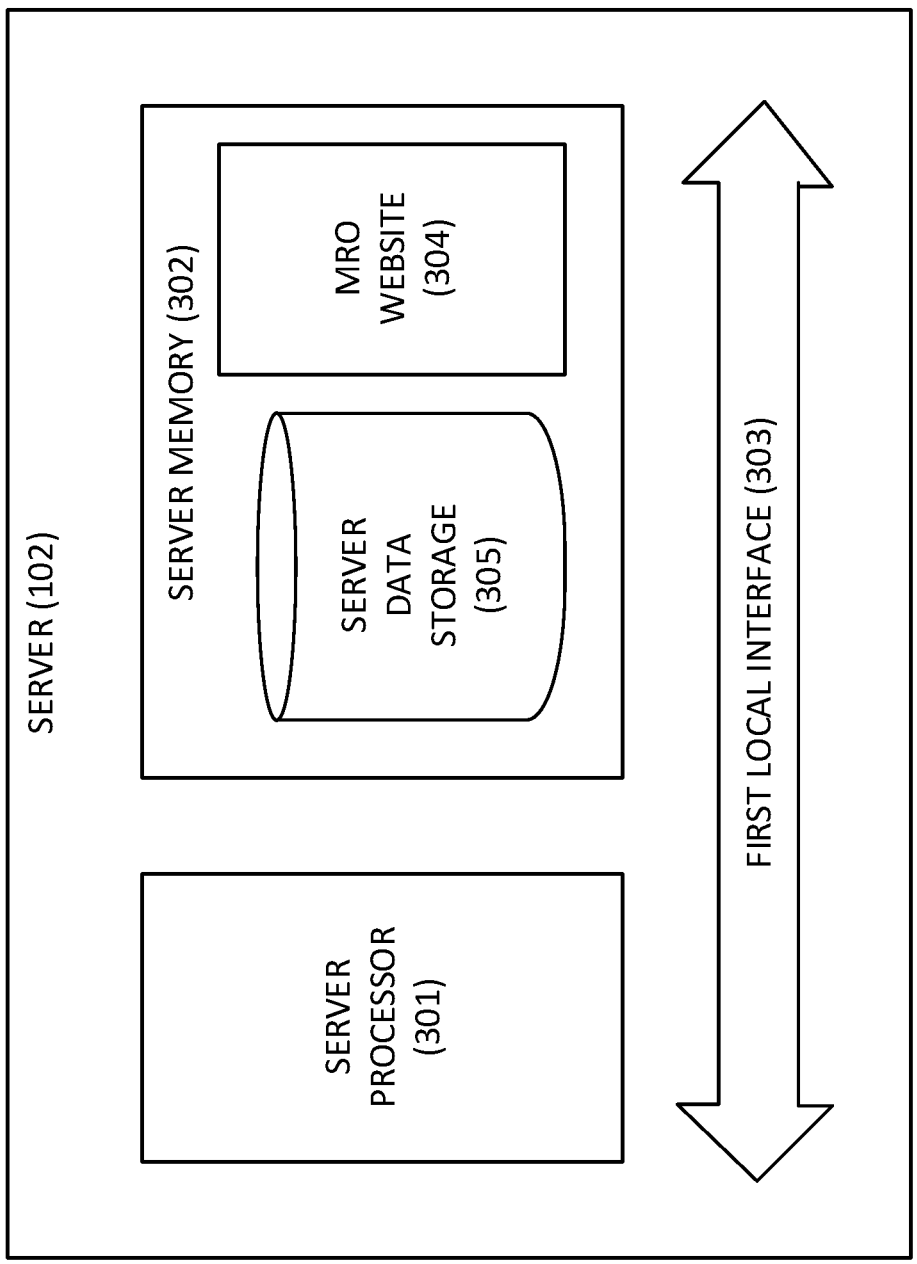
FIG. 3 illustrates a schematic diagram of a server according to an embodiment of the present disclosure.

FIG. 3 illustrates a schematic diagram of server 102 according to an embodiment of the present disclosure. Server 102 can comprise a server processor 301, and a server memory 302 and a first local interface 303. First local interface 303 can be a program that controls a display for the user, which can allow user to view and/or interact with server 102. Server processor 301 can be a processing unit that performs set of instructions stored within server memory 302. Server memory 302 can comprise an MRO (maintenance, repair, and operating supplies) website 304, and a server data storage 305. MRO website 304 can comprise business logic for server 102. In this embodiment MRO website 304 can contain HTML (Hyper Text Markup Language), scripts, and/or applications such as an embedded emergency care video chat application. Server data storage 305 can be collections of data accessible through MRO web site 304. Further, MRO website 304 can perform functions such as adding, transferring and retrieving information on server data storage 305 using first local interface 303.

Server 102 includes at least one processor circuit, for example, having server processor 301 and server memory 302, both of which are coupled to first local interface 303. To this end, server 102 can comprise, for example, at least one server, computer or like device. First local interface 303 can comprise, for example, a data bus with an accompanying address/control bus or other bus structure as can be appreciated.

In particular, stored in the server memory 302 and executable by server processor 301 are website 304, and potentially other applications. Also stored in server memory 302 can be server data storage 305 and other data. In addition, an operating system can be stored in server memory 302 and executable by server processor 301.

It is understood that there can be other applications that are stored in server memory 302 and are executable by server processor 301 as can be appreciated. Where any component discussed herein is implemented in the form of software, any one of a number of programming languages can be employed such as, for example, C, C++, C#, Objective C, Java, Java Script, Perl, PHP, Visual Basic, Python, Ruby, Delphi, Flash, or other programming languages.

A number of software components can be stored in server memory 302 and can be executable by server processor 301. In this respect, the term "executable" means a program file that is in a form that can ultimately be run by server processor 301. Examples of executable programs can be, for example, a compiled program that can be translated into machine code in a format that can be loaded into a random access portion of server memory 302 and run by server processor 301, source code that can be expressed in proper format such as object code that is capable of being loaded into a random access portion of server memory 302 and executed by server processor 301, or source code that can be interpreted by another executable program to generate instructions in a random access portion of provider memory 302 to be executed by server processor 301, etc. An executable program can be stored in any portion or component of server memory 302 including, for example, random access memory (RAM), read-only memory (ROM), hard drive, solid-state drive, USB flash drive, memory card, optical disc such as compact disc (CD) or digital versatile disc (DVD), floppy disk, magnetic tape, network attached/addressable storage or other memory components.

Figure 4:
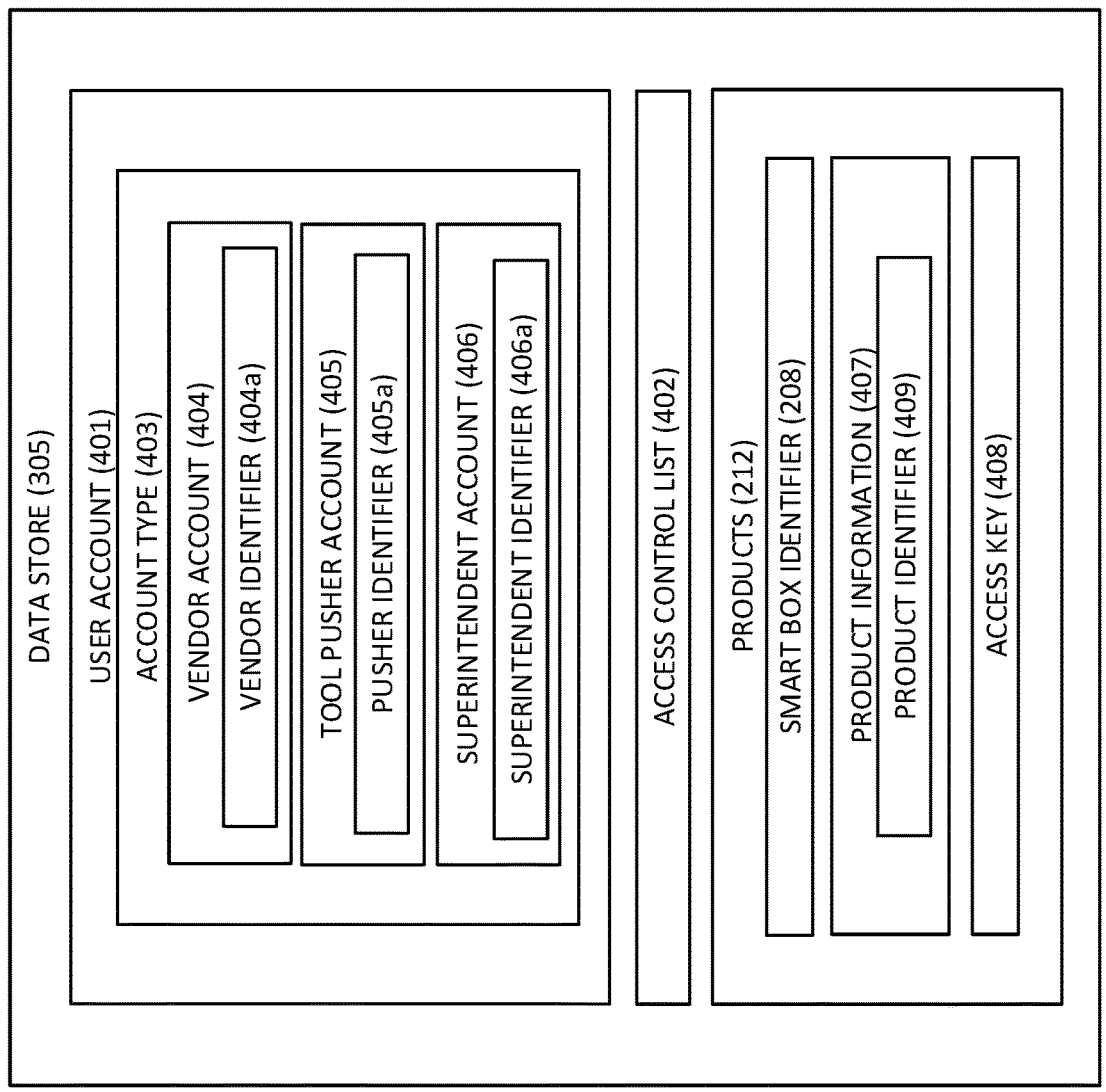
FIG. 4 illustrates a data store comprising one or more user account, and one or more products.

FIG. 4 illustrates data store 305 comprising one or more user account 401, an access control list 402, and products 212. In one embodiment, each user account 401 can be related to a user that is registered on MRO website 304. Each user account 401 can comprise profile information, which was entered during registration on MRO website 304, which can include but is not limited to, an account type 403, account user identifier, name, username, password, contact information, payment information, and company information. In one embodiment, account type 403 can indicate the purpose of user account 401, which can either be a vendor account or a buyer account. In such embodiment, users registering on MRO website 304 can only select one account type 403 for each user account 401 being created. In an example embodiment, account type 403 can comprise a tool a vendor account 404, a tool pusher account 405, and a superintendent account 406. Vendor account 404 can be created by user who sell parts and equipment of the oil rig. In one embodiment, vendor account 404 can be related to manufacturer, supplier, and/or seller of drilling rig parts. Vendor account 404 can comprise a vendor identifier 404*a*. Vendor identifier 404*a* can be a unique identification for each vendor account 404. Tool pusher account 405 can be created by users who are in charge of rig operations and direct the drilling on an oil rig. Moreover, users with tool pusher account 405 can be in charge of maintenance of drilling rig tools, equipment, and supplies. Tool pusher account 405 can comprise a tool pusher identifier 405*a*. Tool pusher identifier 405*a* can be a unique identification for each tool pusher account 405. Superintendent account 406 can be created by users who supervise the drilling on oil rigs. Furthermore, users with superintendent account 406 can be in overall charge of the drilling and associated activities. Superintendent account 406 can comprise a superintendent identifier 406*a*. Superintendent identifier 406*a* can be a unique identification for each superintendent account 404. In this example embodiment, vendor account 404 can represent a seller account on MRO website 304, while tool pusher account 405 and superintendent account 406 can represent a buyer account on MRO website 304. In one embodiment, access control list 402 can comprise lists of credentials, such as access key, biometric data, and/or machine-readable code that can grant permission to a user to access smart box control system 101. Product 212 can be any purchasable or leasable part, expendable, and component of a drilling rig listed in MRO website 304. In one embodiment, a product listing related to product 212 can comprise product information 407, and access key 408. Product information 407 can comprise data information about the item such as product identifier 409, product name, description, no. of product in stock, manufacturer, etc. Product identifier 409 can be a unique identification for each product 212 on MRO website 304. Further in one embodiment, each product 212 created on MRO website 304 can be assigned with smart box identifier 208. This can allow MRO website 304 to identify which smart box control system 101 contains a specific product 212. In one embodiment, access key 408 can be a unique access code that can allow a user to access smart box control system 101. In another embodiment, access key 408 can be automatically generated for every order transactions made on MRO website 304. In one embodiment, access key 408 can be a password. In such embodiment, access key 408 can be a unique string of alphanumeric character. In another embodiment, access key 408 can be a barcode such as QR codes, or UPCs. In this embodiment, access key 408 can be a machine-readable medium. Machine-readable medium can be a medium capable of storing data in a format that can be readable by a mechanical device such as electronic reader 205, or scanners. Further in another embodiment, access key 408 can be a biometric data. Biometric data can be a unique personal data that can confirm the identification of an individual. In such embodiments, access key 408 can be used such that the individual can be granted permission to access and or manage products 212 within each smart box control systems 101. In one embodiment, each access key 408 generated and/or gathered from MRO website 304 can be stored within access control list 402.

Figure 5:
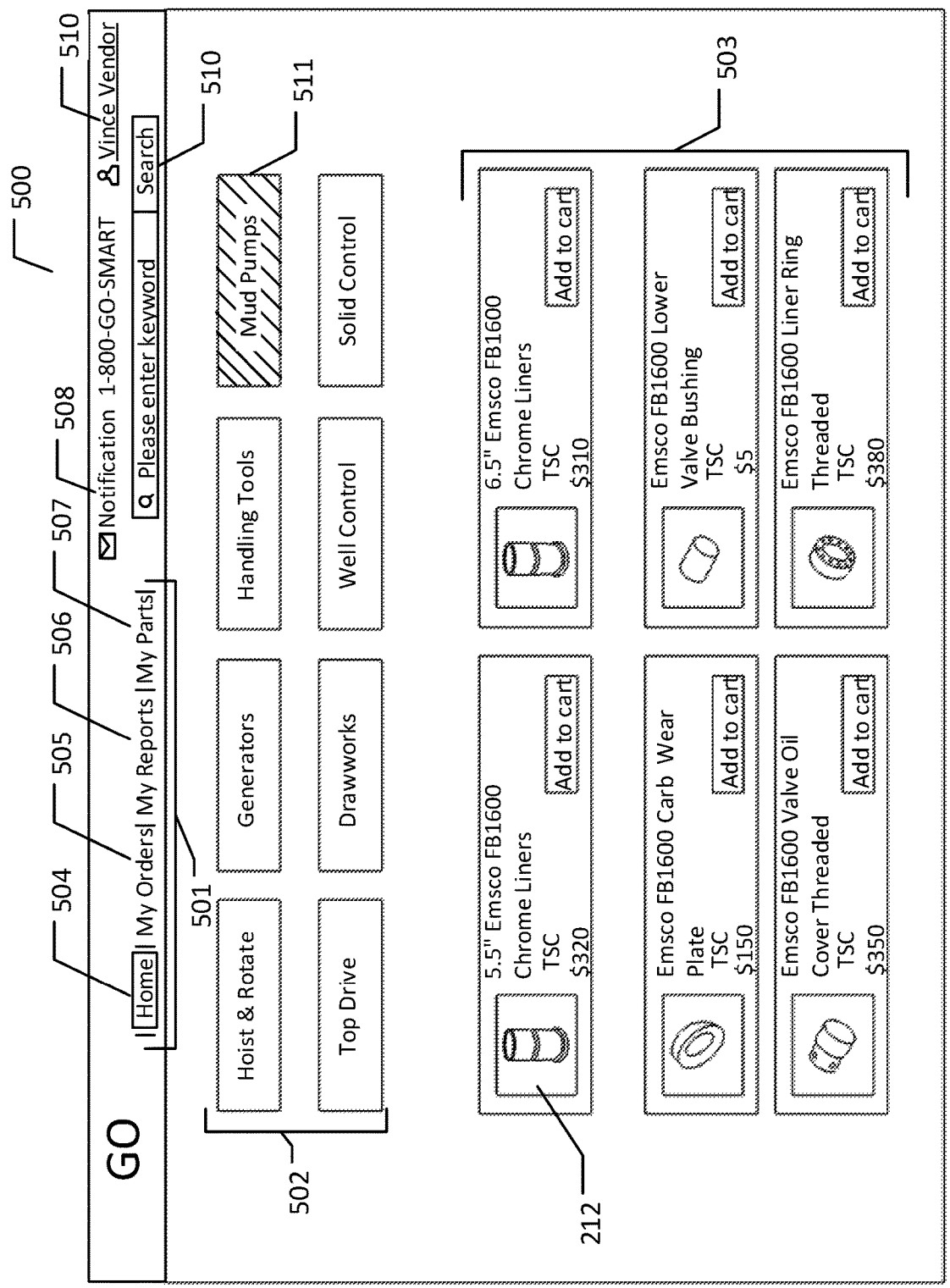
FIG. 5 illustrates a vendor home screen.

FIG. 5 illustrates a vendor home screen 500. Initially, an individual registers in order to login on MRO website 304. During registration, the individual can be required to select the type of account being created. As such, screen display for each user account 401 can vary according to account type 403 selected during the registration. Once user is registered, each user account 401 can be assigned with a unique identifier i.e. vendor identifier 404a, pusher identifier 405a, and superintendent identifier 406a. In one embodiment, each user account identifier can be access key 408. In this embodiment, a vendor with vendor account 404 can login to MRO website 304 to access vendor home screen 500. In one embodiment, vendor home screen 500 can comprise a navigation bar 501, a rig parts section 502, and a vendor's-regular-purchases section 503. Navigation bar 501 can comprise graphical control element such as buttons, icons, menus, and other input or output elements, which can allow the user to have constant access to different functions of MRO website 304. In this embodiment, navigation bar 501 can comprise functions for vendor account 404, such as a home widget 504, a vendor's-my-orders widget 505, a vendor's-my-reports widget 506, a my-parts widget 507, notifications widget 508, a my-account widget 509, and a search widget 510. For purposes of this disclosure, widget can be a graphical control element that can allow user to interact or access a specific function in MRO website 304. Examples of graphical control element can include but are not limited to buttons, tabs, icons, menus, and links. Home widget 504 can allow the user to access home screen of MRO website 304. In this embodiment, clicking home widget 504 can display vendor home screen 500. Vendor's-my-orders widget 505 can allow the user to access a vendor's-my-orders page of MRO website 304. My-parts widget 507 can allow user to access a my-parts page of vendor account 404. In this embodiment, my-parts widget 507 can comprise products 212 added by the vendor. As such, my-parts widget 507 can comprise products 212 available for purchase to buyers with buyer accounts in MRO website 304. Notifications widget 508 can allow user to access notifications page of MRO website 304. In one embodiment, notifications widget 508 on vendor's account 404 can display an alert when new orders from buyers on MRO website 304 has been made. My-account widget 509 can allow user to access and update information for user account 401, such as company information, user information, payment information, and batch uploads, etc. In this embodiment, the vendor can view and update profile information on vendor account 404. In one embodiment, search widget 510 can allow the vendor to search for a specific product 212 within vendor's account 404. In another embodiment, search widget 510 can allow the vendor to search for a specific product 212 within MRO website 304. As such, the user can check product availability from other vendors of MRO website 304. In one embodiment, rig parts section 502 can be a drill-down navigation of a rig. In such embodiment, each rig can be displayed as a graphical user interface or a graphical control element such as clickable image, buttons, icons, links, and other input or output elements. In one embodiment, rig parts section 502 can comprise one of a plurality of depictions of a rig as will be discussed below. In one embodiment, each depiction can comprise one or more clickable rig parts 511. Each clickable rig part 511 can be linked to a further depiction or to a product 212. In one embodiment, vendor's-regular-purchases section 503 can display products 212 that are top-selling on vendor account 404. In such embodiment, selecting a clickable rig part 511 from rig parts section 502 can display top-selling products 212 for the selected rig part under vendor's-regular-purchases section 503. As an example shown on FIG. 5, "mud pumps" can be selected under rig parts section 502. In response to the vendor choosing "mud pumps," products 212 displayed under vendor's-regular-purchases section 503 comprises components of "mud pumps" such as "liners". In another embodiment, products 212 can be auto-arranged such as by frequency of sale or number of items sold.

Figure 6:
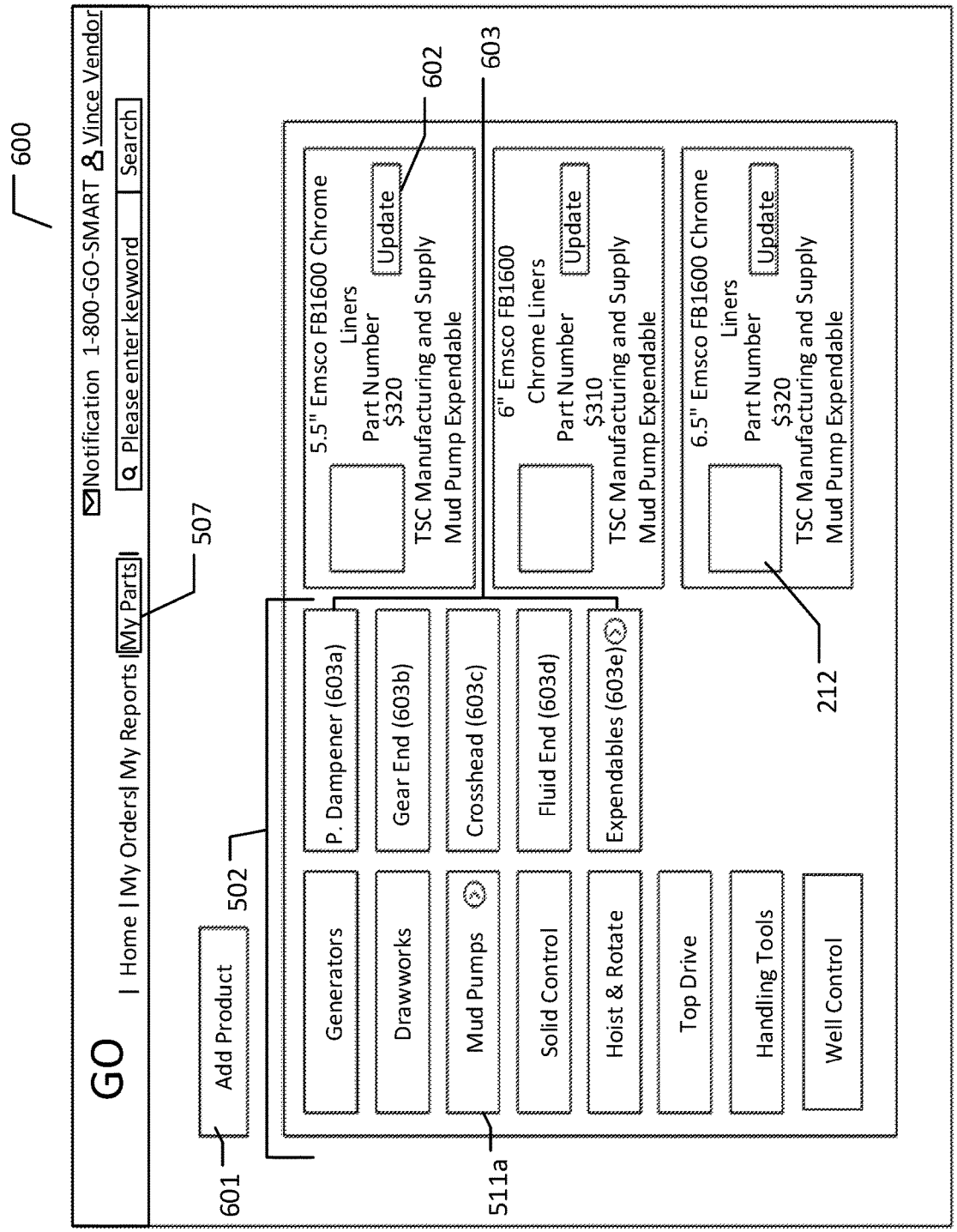
FIG. 6 illustrates a my-parts page of a vendor account.

FIG. 6 illustrates a my-parts page 600 of vendor account 404. My-parts page 600 can allow the vendor to add, update, and/or delete each product 212 on vendor account 404. As such, my-parts page 600 can allow the vendor to manage an inventory of product 212 on vendor account 404. To access my-parts page 600, the user can click on my-parts widget 507 on navigation bar 501. In one embodiment, my-parts page 600 can comprise an add product widget 601, an update product widget 602, and rig parts section 502. Add product widget 601 can allow user to add products 212 to the inventory of vendor account 404. Update product widget 602 can allow user to edit each product 212 on the inventory of vendor account 404. As such, the vendor can update product information 407 on vendor account 404, such as, product name, product description, number of stocks, etc. Further in one embodiment, my-parts page 600 can display rig parts section 502 wherein user can click through clickable rig parts 511 to drill-down specific part of the rig. In one embodiment, clicking on each clickable rig part 511 can display an exploded view of rig part 511. As such, clickable rig part 511 can comprise a plurality of depictions. In one embodiment, depictions can be an exploded view depiction of the rig, which can be shown and further discussed below. In one embodiment, each depiction can comprise products 212. Products 212 can be other elements or smaller parts that makes up each rig part 511. Further as an example embodiment shown in FIG. 6, clicking a specific rig part 511a such as "mud pumps" from rig parts section 502 can display another depiction of clickable rig part 511. In one embodiment, the depiction of clickable rig part 511 can be linked to a further depiction of clickable rig part 511. As an example embodiment, selecting "Mud Pumps (511a)" on my parts page 600 displays another depiction of clickable rig parts 511, which comprises a plurality of components 603 such as "P. Dampener (603a)", "Gear End (603b)", "Crosshead (603c)", "Fluid End (603d)", and "Expendables (603e)". In another embodiment, the depiction of clickable rig part 511 can be linked to products 212. As an example embodiment, clicking clickable rig part 511 such as "Expendables (603e)" can be linked to product 212 such as "Emsco FB1600 Chrome Liners".

In these example embodiments, first depiction can be displayed through rig parts section 502 wherein "mud pumps" 511a was selected, as shown in FIG. 5. Furthermore, clicking "expendables" 603e from the list can then display third depiction wherein products 212 that are added by the vendor under "expendables" 603e such as "5.5" Emsco FB1600 Chrome Liners", "6" Emsco FB1600 Chrome Liners", and "6.5" Emsco FB1600 Chrome Liners" can be displayed. In such embodiment, depiction can depend on rig part 511 selected.

Further in one embodiment, products 212 on vendors account 404 can be added one-by-one once vendor is logged in on MRO website 304. In such embodiment, the vendor can click on add product widget 601 to access an add products screen of MRO website 304. In another embodiment, products 212 listed under my-parts page 600 can be created by the vendor during the registration process on MRO website 304. In such embodiment, the vendor can fill-out a custom-made template in order to add multiple products 212 on vendor's account 404. Further in another embodiment, the custom-made template can also be available on vendor account 404 as "batch upload" under my-account widget 509. In this embodiment, the vendor can store multiple products 212 at once or per batch by filling out the custom-made template and uploading it on MRO website 304.

Figure 7:
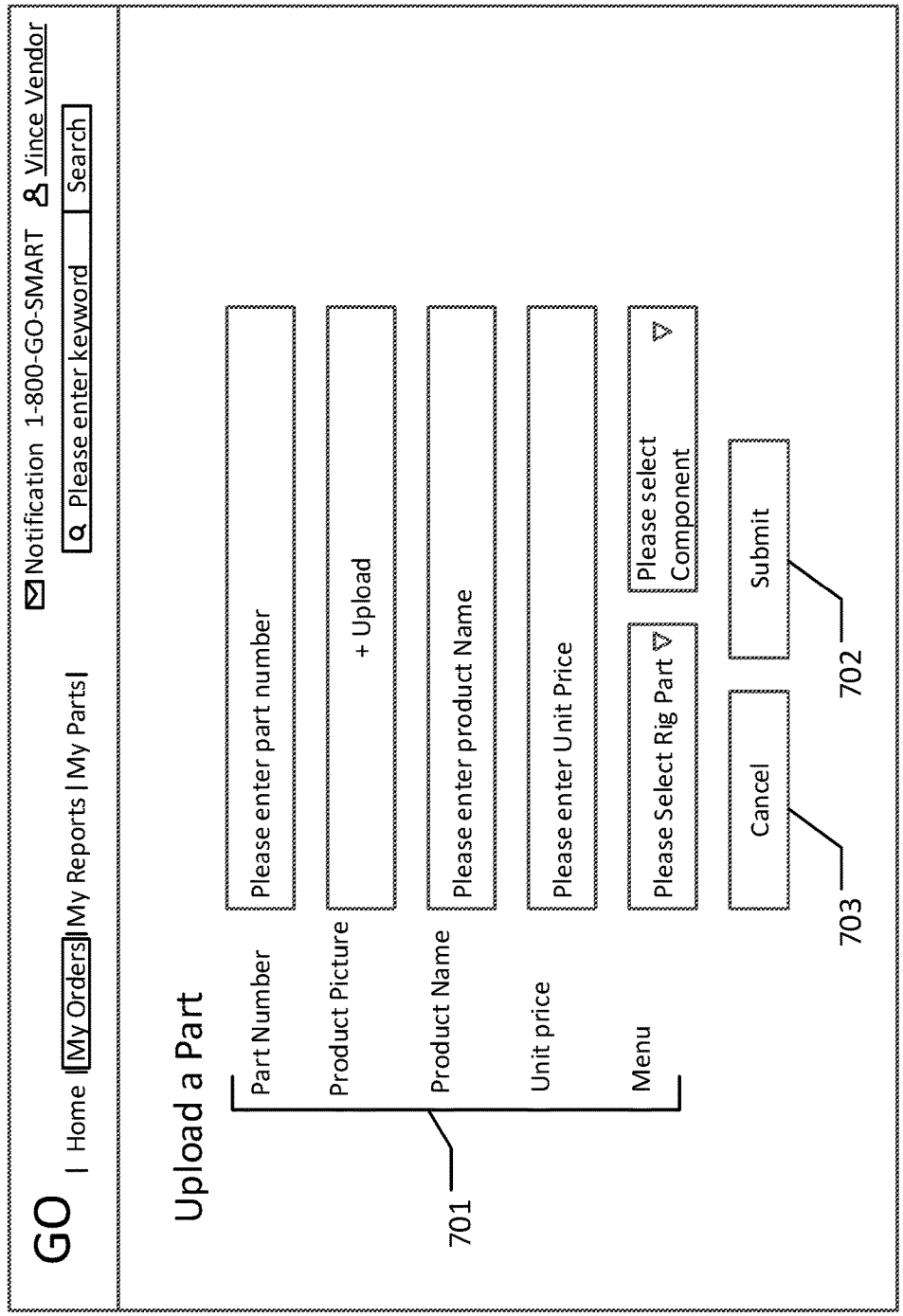
FIG. 7 illustrates an add product page.

FIG. 7 illustrates an add product page 700. The vendor can access add product page 700 by clicking add product widget 601 on my-parts page 600. In one embodiment, add product page 700 can comprise one or more product information fields 701, a submit widget 702, and a cancel widget 703. Product information fields 701 can allow user to enter product information 407 such as part name, part number, product name, product picture, unit price, menu, etc. Furthermore, product information field 701 can allow vendor to select which rig part 511 and component 603 a product being added can be under. Submit widget 702 can be a button, link, or an icon that allow a user to confirm an action on MRO website 304. In this embodiment, clicking submit widget 702 can be related to adding and/or storing a specific product under products 212. Moreover in this embodiment, cancel widget 703 can allow user to close out of add product page 700. In one embodiment, adding products 212 on MRO website 304 can be related to assigning product identifier 409 with vendor identifier 404a. In another embodiment, each product 212 can be assigned with smart box identifier 208.

Figure 8A:
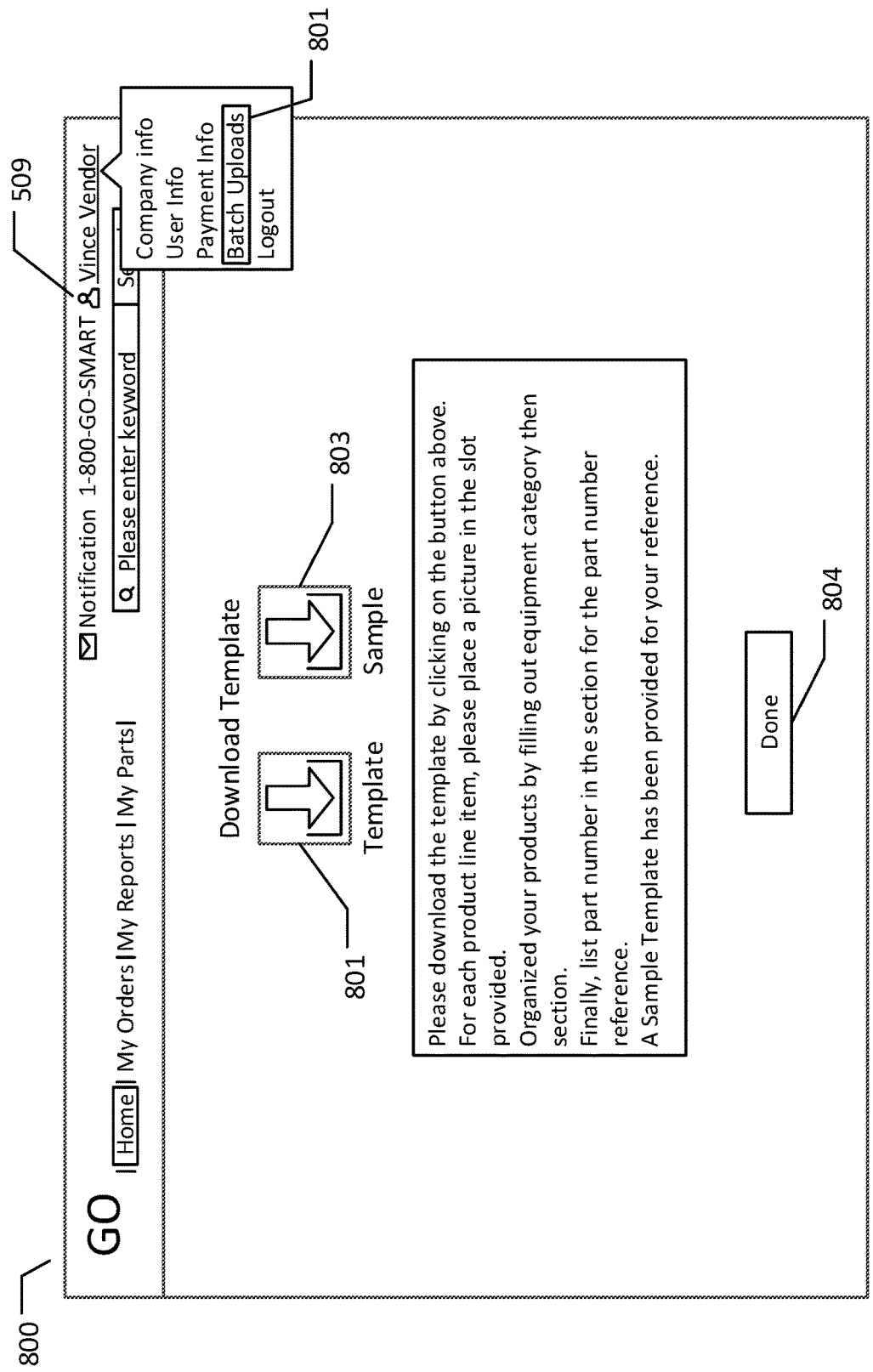
FIG. 8A illustrates a batch upload page.

FIG. 8A illustrates a batch upload page 800. In an embodiment wherein vendor would like to add multiple products on vendor account 404, the vendor can go to my-account widget 509 and click on a batch upload widget 801 to access batch upload page 800. Batch upload page 800 can comprise a download template widget 802, a download sample widget 803, and a done widget 804. Clicking download template widget 802 can allow the vendor to download a custom-made template for creating multiple products 212 on MRO website 304. The vendor can then fill up the custom made template provided. The vendor can also click on download sample widget 803 and use it as reference when filling up the custom made template provided on MRO website 304. After filling up the custom made template, the vendor can click on done widget 804 to upload the filled up template. Further in this embodiment, each product 212 uploaded through batch upload method can each be assigned with product identifier 409. Moreover, products 212 created through this method can be linked to vendor identifier 404a of the vendor who uploaded the products through batch upload method.

Figure 8B:
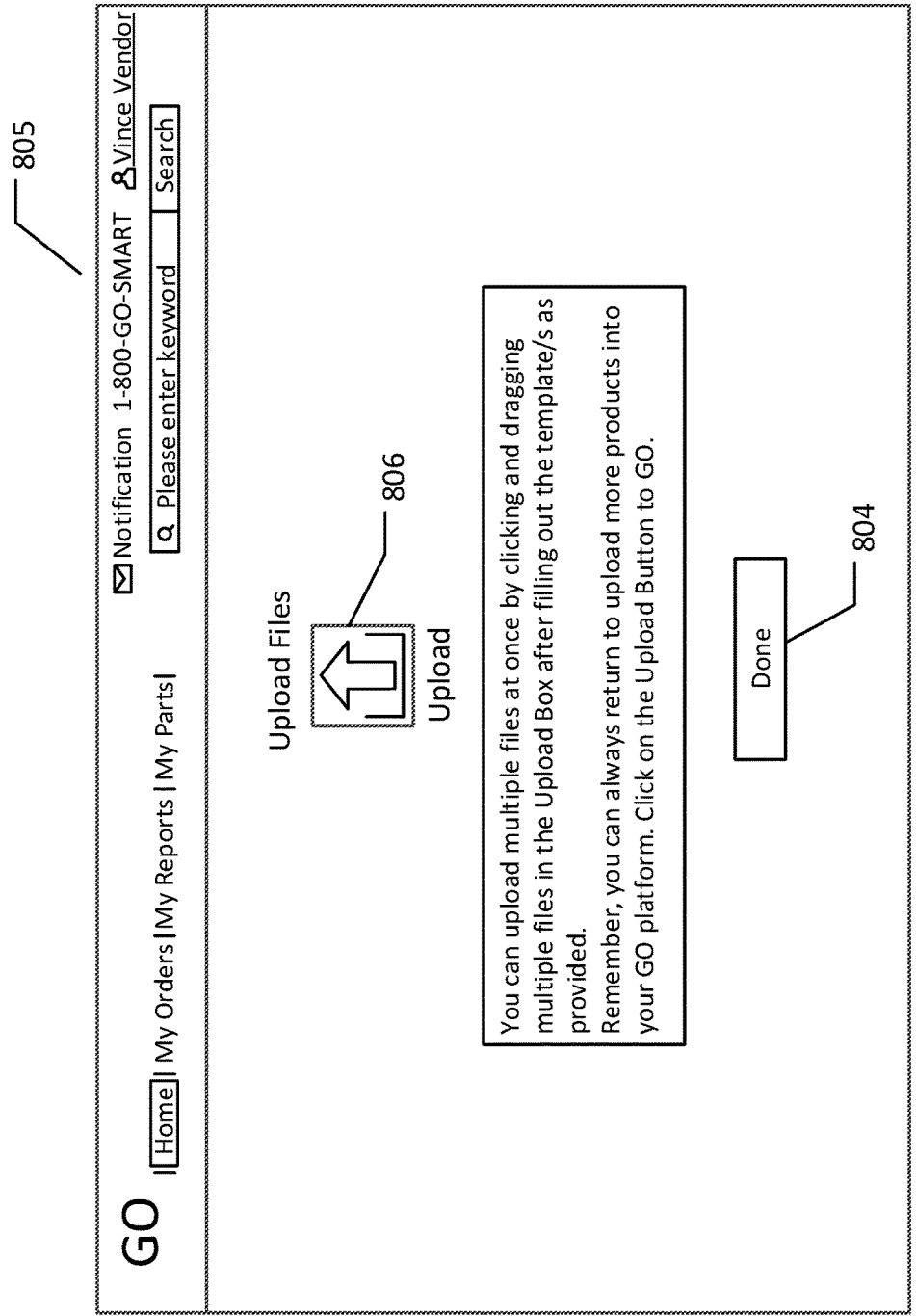
FIG. 8B illustrates an embodiment of an upload file page.

FIG. 8B illustrates an embodiment of upload file page 805. In one embodiment, clicking done widget 804 on batch upload page 800 can open upload file page 805. File upload page 805 can comprise an upload file widget 806 that can allow user to select the filled up custom-made template. In one embodiment, vendor can upload multiple files at once by dragging multiple files onto upload file widget 806. Once all files are uploaded, vendor can click on done widget 804 to close out of upload file page 805.

Figure 9:
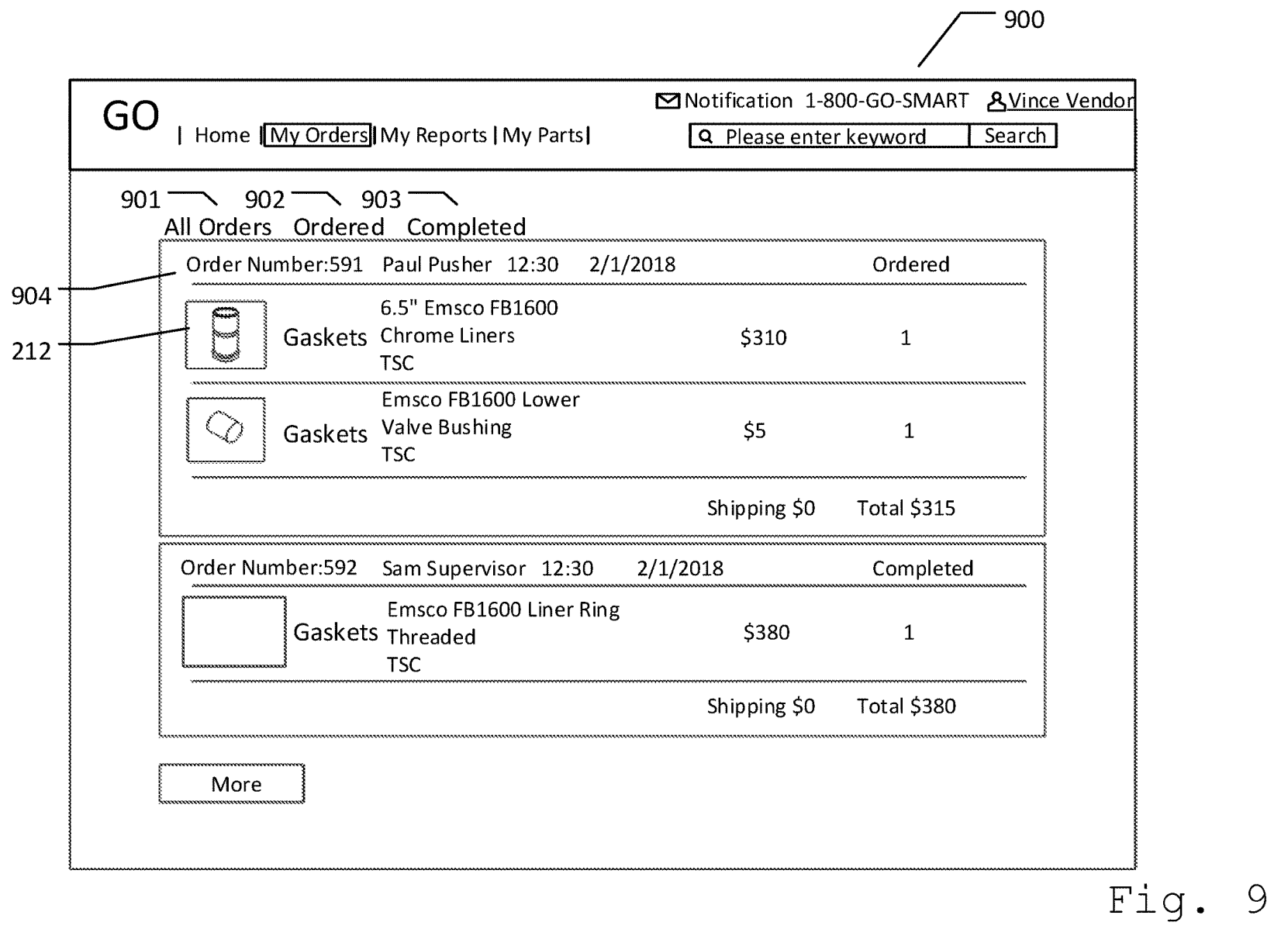

FIG. 9 illustrates a vendor's my-order page 900. Clicking vendor's-my-orders widget 505 on navigation bar 501 can display vendor's my-order page 900. In one embodiment, vendor's-my-orders page 900 can comprise a vendor's all-orders section 901, a vendor's ordered section 902, and a vendor's completed-order section 903. All-orders section 901 can comprise list of active orders and completed orders on vendor's account 404. All-orders section 901 can display one or more orders 904 made by tool pushers accounts 405 and superintendent accounts 406 from MRO website 304. Each order 904 can comprise one or more products 212 that a buyer wants to purchase. In one embodiment, each order 904 can comprise order details that can include but is not limited to buyer information, date and/or time order was made, order number, ordered item, number of items ordered, amount of each item ordered, total amount of ordered items, shipping fee, etc.

Ordered section 902 can comprise list of active orders received by vendor's account 404. As such, orders 904 that are not yet claimed by the buyer and/or orders 904 that are awaiting payments from the buyer can be listed under ordered section 902. Completed-order section 903 can comprise list of completed orders on vendor's account 404. This section can comprise list of orders that are paid and claimed by the buyers.

FIG. 10 illustrates a vendor's my-reports page 1000. The vendor can access my-reports page 1000 by clicking vendor's-my-reports widget 506 on navigation bar 501. In one embodiment, vendor's-my-reports page 1000 can display an overview of orders and earnings made by the vendor through MRO website 304.

Figure 11A:
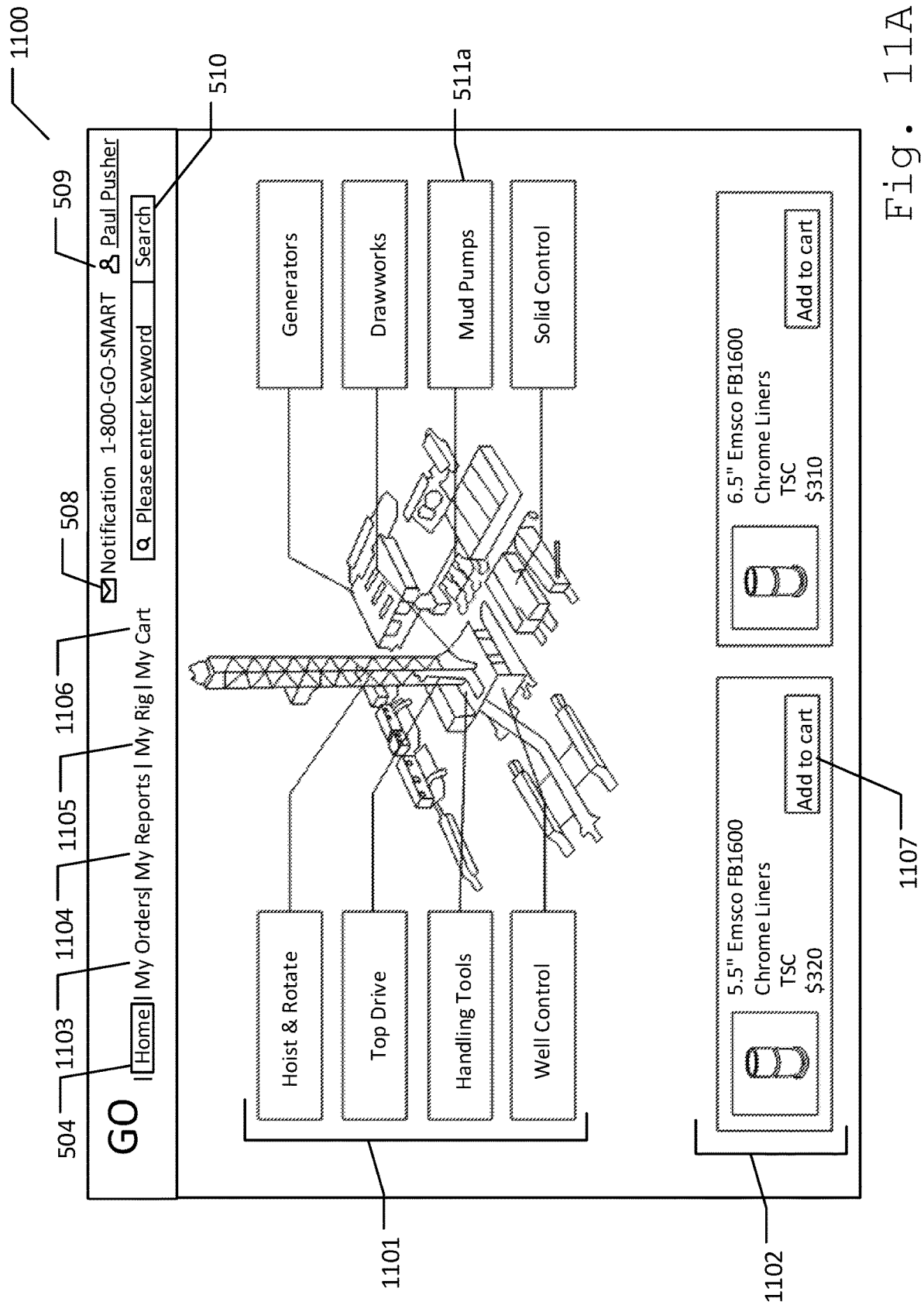
FIG. 11A illustrates a tool pusher home screen.

FIG. 11A illustrates a tool pusher home screen 1100. In this embodiment, a buyer with tool pusher account 405 can login to MRO website 304 to access tool pusher home screen 1100. In one embodiment, tool-pusher home screen 1100 can comprise navigation bar 501, rig overview section 1101, and a buyer's-regular-purchases section 1102. In this embodiment, navigation bar 501 can comprise home widget 504, buyer's-my-orders widget 1103, buyer's-my-reports widget 1104, notifications widget 508, my-account widget 509, a tool pusher's my-rig widget 1105, and buyer's-my-cart widget 1106. In this embodiment, rig overview section 1101 can display drilling rig assigned to the tool pusher. In one embodiment, rig overview section 1101 can be similar to rig parts section 502 wherein rig parts can be displayed as a drill-down navigation graphical user interface (GUI) such as a button, image, menu, or link. In such embodiment, the user can click through clickable rig parts 511 to find a specific product 212 to purchase. As such, the user can click on one of clickable rig parts 511 to drill-down other components 603 that makes up the selected rig part 511, as can be further discussed below. Further in one embodiment, rig overview section 1101 can be related to a first depiction 1108a from a plurality of depiction 1108. In one embodiment, depiction 1108 can display clickable rig parts 511 that can be further expanded into other depiction 1108. In another embodiment, depiction 1108 can display component 603 or product 212 that can be available for purchase. The user can only place an order for products 212 associated to drilling rig assigned to tool pusher account 406. Rig overview section 1101 can allow buyers to drill-down navigate through each rig parts 511 and purchase the desired product, as further discussed below. Further in one embodiment, buyer's-regular-purchases section 1102 can display products 212 that the user purchases regularly. In such embodiment, buyer's-regular-purchases section 1102 can comprise an add-to-cart widget 1107 to provide the buyer a quick access to products 212 that are regularly ordered on tool pusher account 406. Clicking add-to-cart widget 1107 on buyer's-regular-purchases section 1102 can allow user to add the selected product 212 on an add-to-cart page of MRO website 304. In another embodiment, regular-purchases section 1102 can be auto-arranged such as by frequency of products bought, or number of items bought.

Figure 11B:
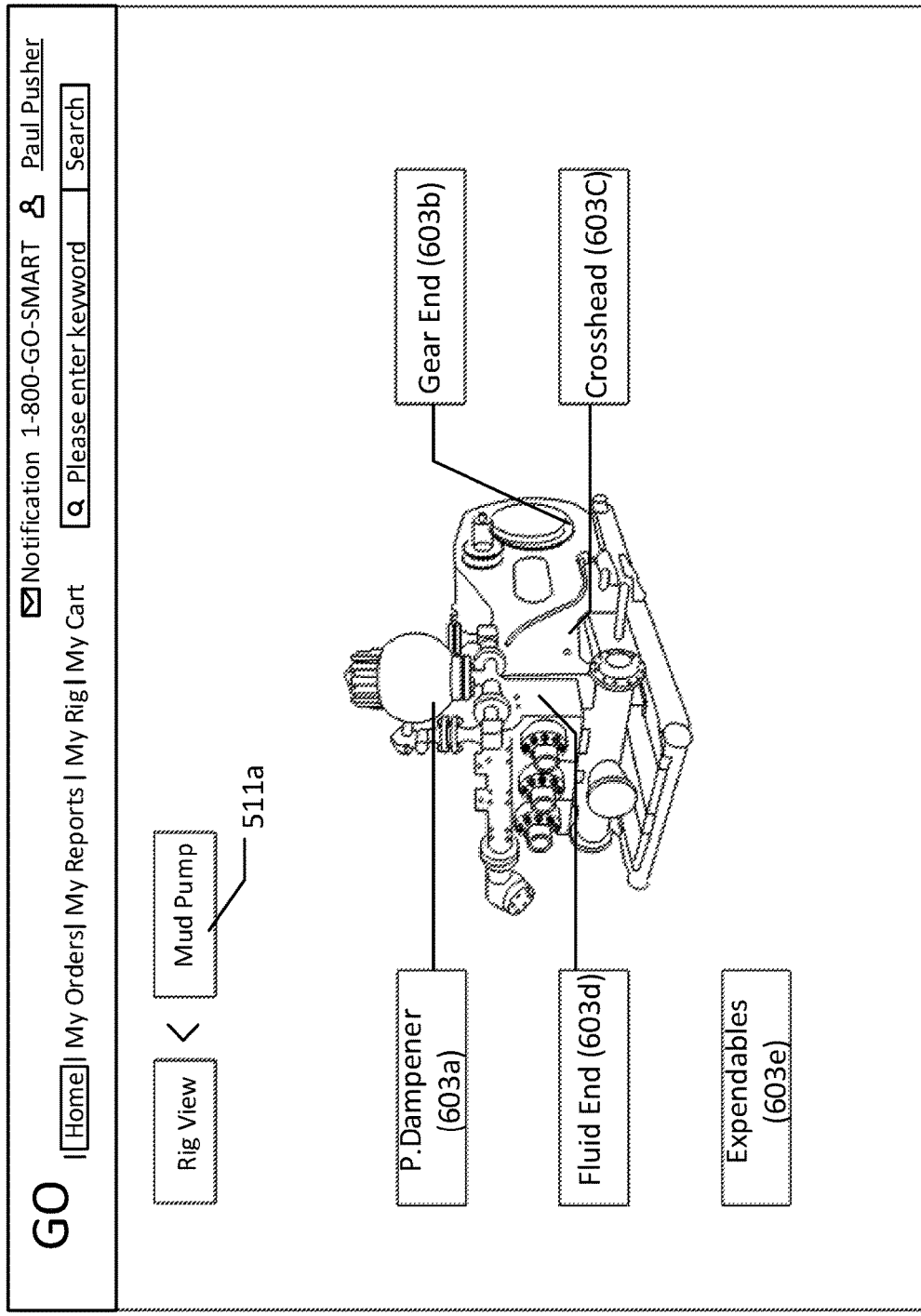
FIG. 11B illustrates a rig view screen.

FIG. 11B illustrates a second depiction 1108b. Clicking one of clickable rig parts 511 on first depiction 1108a on tool pusher's home screen 1100, can further expand and display other areas or components 603 of the rig part selected. As an example embodiment shown in FIG. 11B, clicking "mud pumps" 511a under rig overview section 1102 on vendor's home screen 1100 can display a second depiction 1108b of "mud pumps" 511a comprising components 603 such as "P. Dampener" 603a, "Gear End" 603b, "Cross Head" 603c, "Fluid End" 603d, and "Expendables" 603e.

Figure 11C:
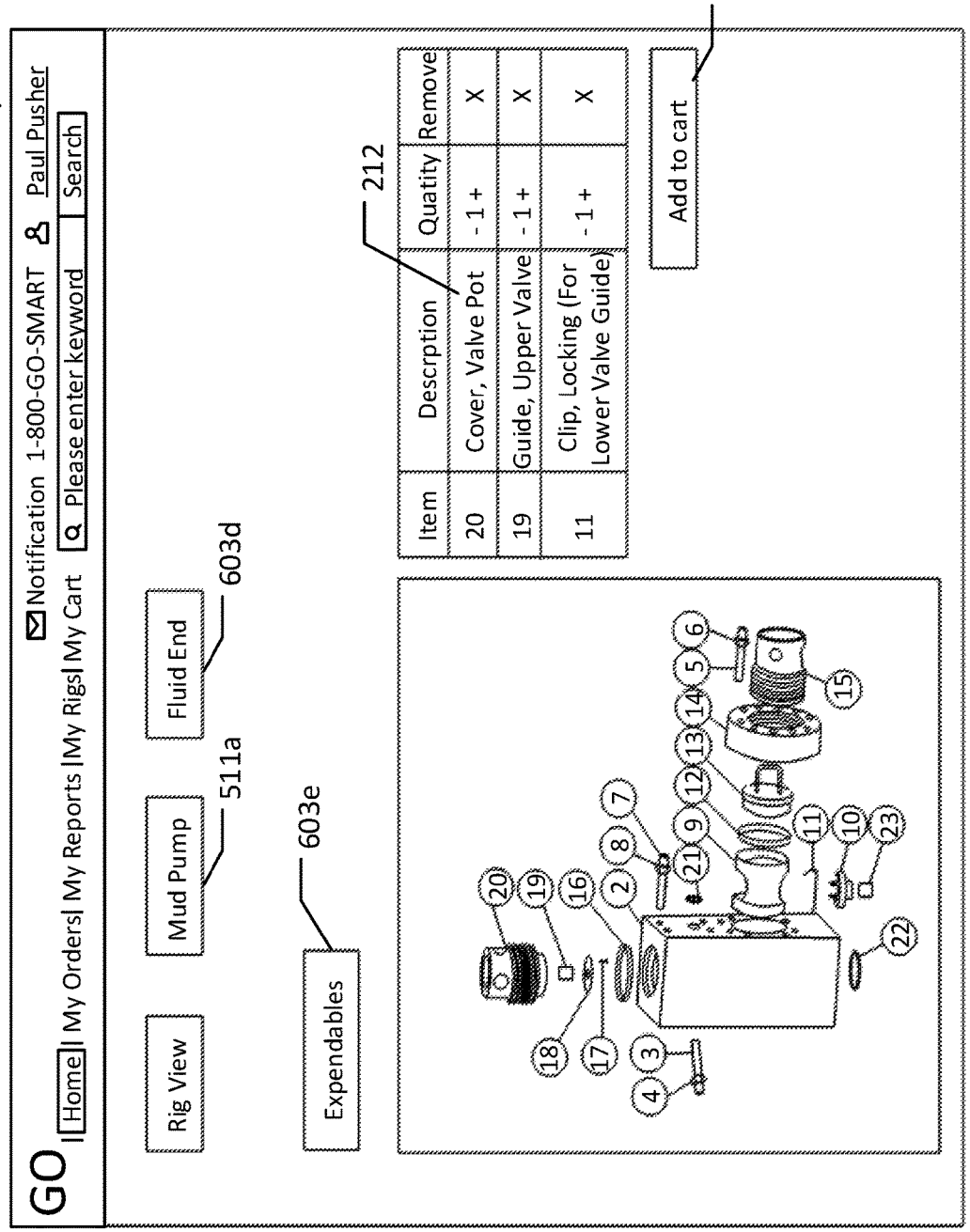
FIG. 11C illustrates a rig view screen displaying different parts of expendables.

FIG. 11C illustrates a third depiction 1108c. In one embodiment, selecting one of components 603 from second depiction 1108b can further explode the selected component. In one embodiment, clickable rig parts 511 can be displayed as an image with each component 603 labeled. This can aid the user in identifying the specific component that the user wants to purchase. As an example embodiment shown in FIG. 11c, selecting "Fluid End" 603d can display the image of "Fluid End" 603d with numbered parts. In this embodiment, parts can be labeled as numbers. As such selecting parts labeled with numbers "20" can display the specific product 212 with product name "Cover, Valve Pot", selecting "19" can display "Guide, Upper Valve", while selecting label "11" can display "Clip, Locking (For Lower Valve Guide)". As such, the user can enter the quantity of items that the user wants to purchase. The user can then click on add-to-cart widget 1107 to proceed in ordering the selected products 212.

Figure 11D:
FIG. 11D illustrates a rig view screen displaying liners.

FIG. 11D illustrates a fourth depiction 1108d. Clicking "expendables" 603e from third depiction 1108c can further explode selected rig part "expendables" 603a. Fourth depiction 1108d can display other components 603 such as liners, pistons, gaskets, etc, as shown in FIG. 11D. Selecting "liners" from the exploded view of expendables can further explode selected component 603.

Figure 11E:
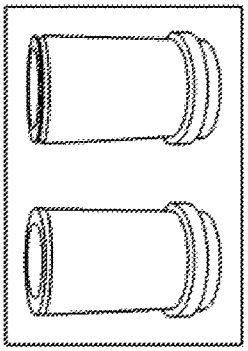
FIG. 11E illustrates a last depiction.

FIG. 11E illustrates a last depiction 1108e. In an embodiment wherein the user wants to purchase "liners", the user can click on "liners" from fourth depiction 1108e to display various types of "liners". As such, last depiction 1108e can display list of parts or products 212 that can be purchased on last depiction 1108e. In such embodiment, rig overview section 1101 can display add-to-cart widget 1107, a product-model selector 1109, and a product list section 1110. Product-model selector 1109 can be a graphical control element such as a dropdown list box, which can allow a user to select an item from the list. In one embodiment, product-model selector 1109 can display different types of rig parts 511. In another embodiment, product-model selector 1109 can display different vendor, manufacturers, and/or suppliers of the selected rig part 511. In such embodiments, the buyer can filter products 212 on product-model selector 1109 according to the selected model and/or manufacturer. As such, product list section 1110 can display lists of products 212 that match the selected rig part 511 and the selected model from product-model selector 1109. In one embodiment, product list section 1110 can comprise product information 407 such as product part numbers, sizes, and quantity, and a quantity field 1111. Quantity field 1111 can allow the buyer to modify and/or enter the quantity of products 212 to order. Then, the buyer can click on add-to-cart widget 1107 to add the chosen product 212 on user's "my-cart" screen.

Figure 12A:
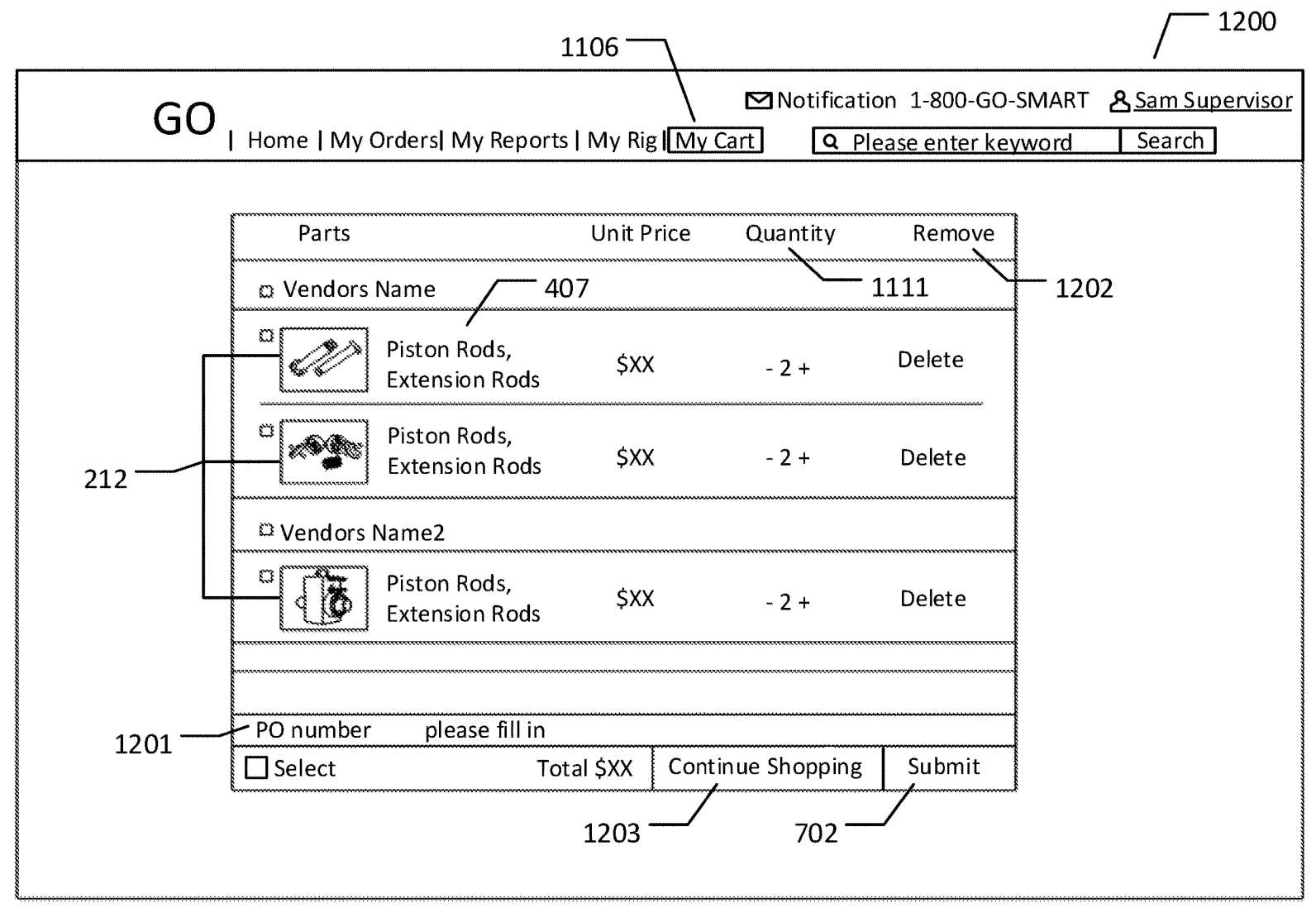

FIG. 12A illustrates a my-cart screen 1200. In one embodiment, a buyer can add products 212 to my-cart screen 1200 through tool pusher's home screen 1100, as shown and discussed in FIG. 11A-11D. In another embodiment, the buyer can click on my-cart widget 1106 on navigation bar 501 to access my-cart screen 1200. My-cart screen 1200 can display products 212 that the user has added into cart. My-cart screen 1200 can comprise product information 407, a purchase order (PO) number field 1201, quantity field 1111, a remove widget 1202, a continue shopping widget 1203 and submit widget 702. In one embodiment, PO number field 1201 can be entered by the user for every order 904 made on MRO website 304. In another embodiment, PO number field 1201 can be automatically generated. Remove widget 1202 can allow user to remove products 212 from my-cart screen 1200. Continue shopping widget 1203 can allow user to continue navigating and selecting other products 212 on MRO website 304. In this embodiment, clicking submit widget 702 can be related to checking out products 212 that the buyer selected.

FIG. 12B illustrates a complete-the-order screen. In one embodiment, complete-the-order screen can comprise order details 1204 and submit widget 702. In one embodiment, order details 1204 can comprise buyer information 1205 and an ordered products section 1206. Buyer information 1205 can comprise buyer's information such as the buyer's name, contact number, email address, payment information, billing address, and shipping address. Ordered products section 1208 can display orders 904 placed for each vendor account 404. This can allow the user to review the list of products, quantity, and total amount of products before placing the order. After filling out buyer information 1205 and reviewing ordered products section 1206 the buyer can click submit widget 702 to complete the order process. In this embodiment, clicking submit widget 702 on complete-the-order screen can be related to placing an order on MRO website 304. As such, vendor identifier 404a that can be assigned to the purchased products 212 can receive a notification on the associated vendor's account 404.

Figure 12C:
FIG. 12C illustrates a completed-order page.

FIG. 12C illustrates a completed-order page 1209. In one embodiment, completed-order page 1209 can comprise buyer information 1205, ordered products section 1206, and an approval status section 1210. In an embodiment wherein the buyer can be using tool pusher account 405, approval status section 1210 can indicate whether orders 904 made by the tool pusher is pending for approval, rejected, or approved by a supervisor. In such embodiment orders 904 made by tool pusher can be under review by the supervisor, a pending status can be displayed under approval status section 1210, as shown in FIG. 12C. In another embodiment wherein the supervisor has rejected orders 904 made by tool pusher, a rejected status can be displayed under approval status section 1210. Further in another embodiment wherein tool pusher's order can be approved by the supervisor, an approval status can be displayed under approval status section 1210. In another embodiment wherein the buyer can be using superintendent account 406, approval status section 1210 can indicate whether the order made is pending, approved, or rejected by the vendor.

Figure 13:
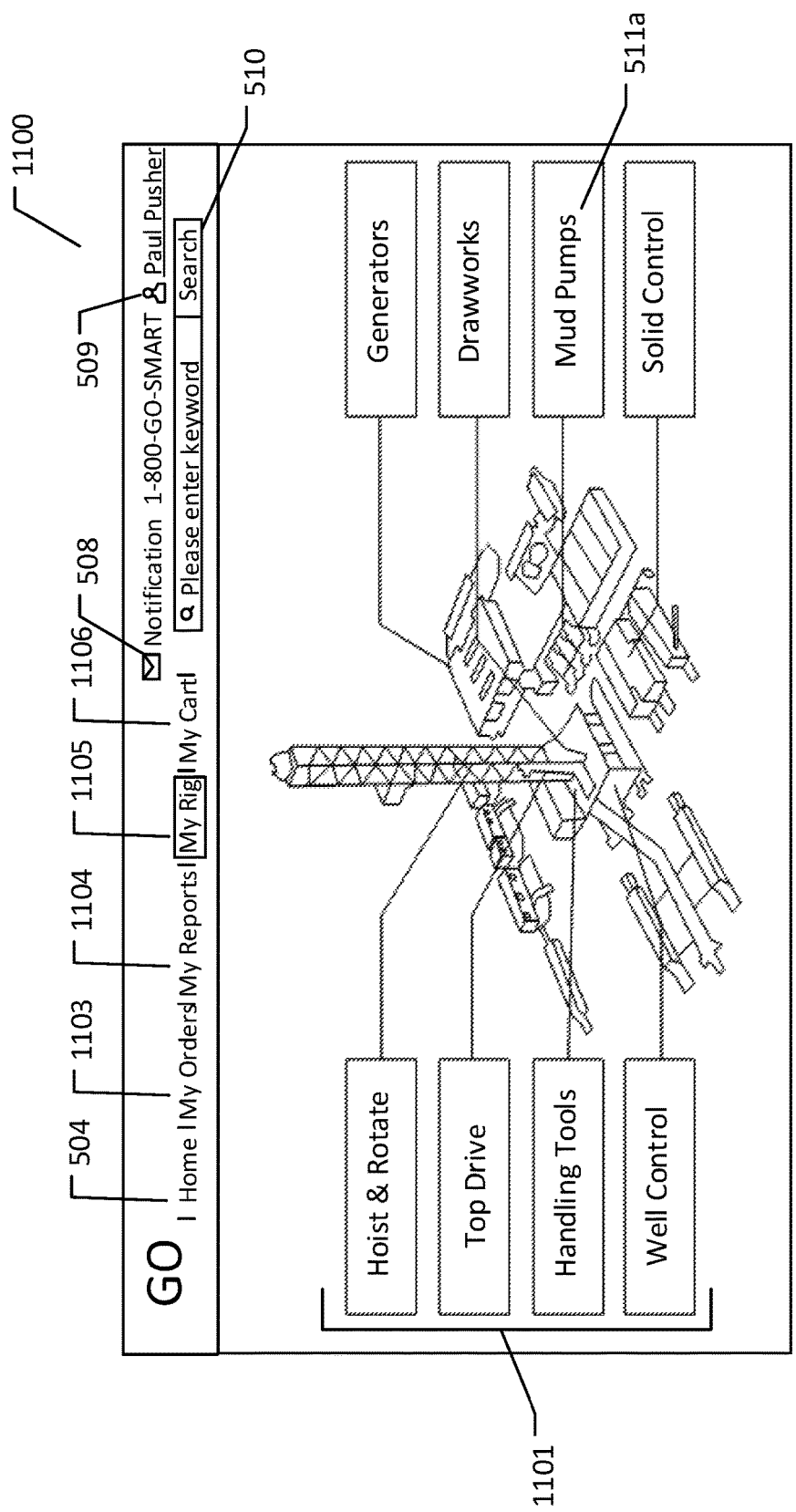
FIG. 13 illustrates a my-rig screen.

FIG. 13 illustrates a my-rig screen 1300. Clicking tool pusher's my-rig widget 1105 can display my-rig screen 1300. In one embodiment, my-rig screen 1300 can display rig overview section 1101 that can allow tool pusher to view rig parts 511 and purchase components 603 by navigating through depiction 1108, as shown and discussed in FIG. 11A-11E.

Figure 14:
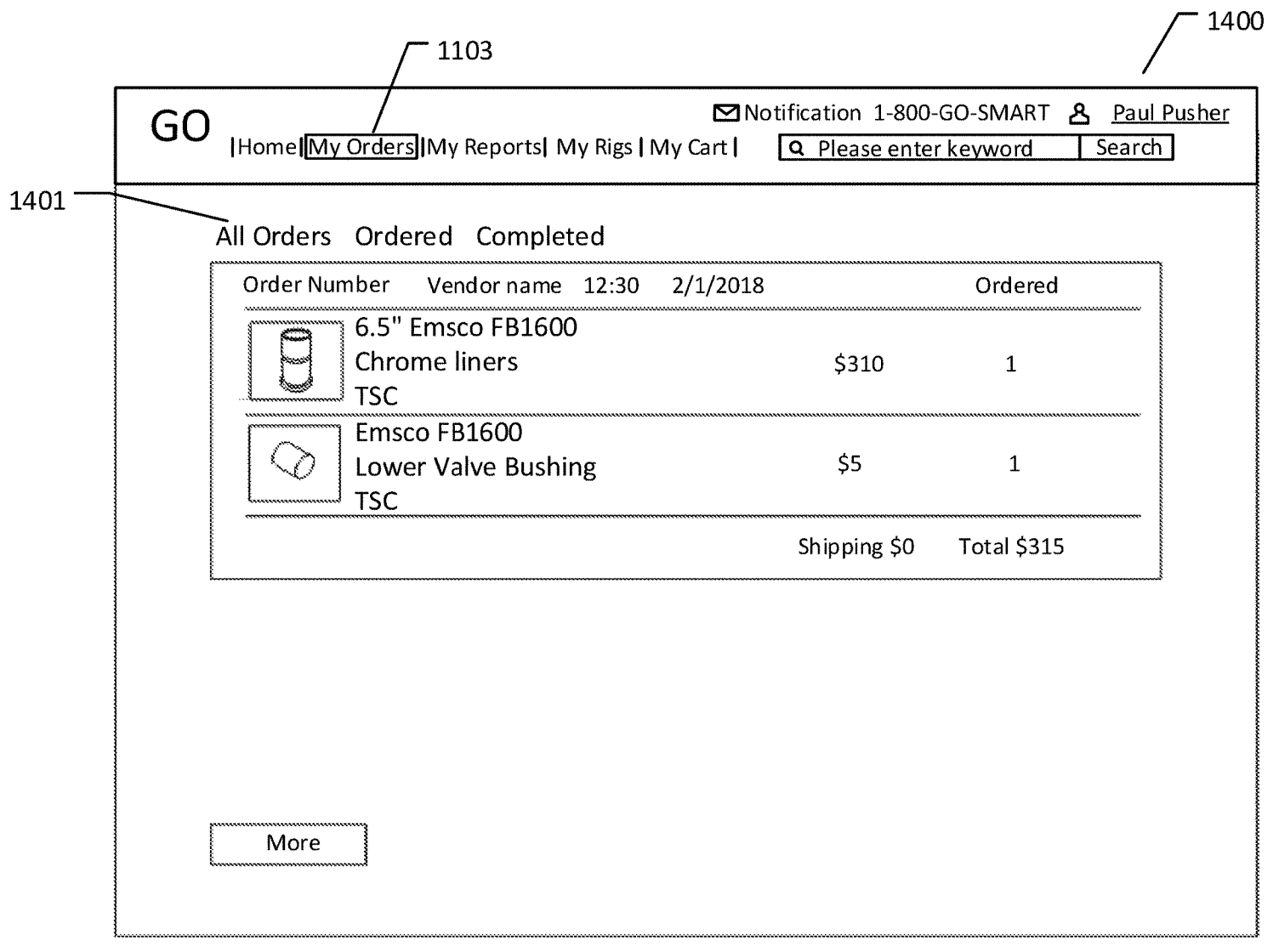

FIG. 14 illustrates a buyer's-my-orders screen 1400. Clicking buyer's-my-orders widget 1103 on navigation bar 501 can display buyer's-my-order screen 1400. In one embodiment, buyer's-my-orders screen 1400 can comprise a buyer's all-orders section 1401, a buyer's ordered section 1402, and a buyer's completed-order section 1403. Buyer's-all-orders section 901 can comprise list of active orders and completed orders on vendor's account 404. Buyer's-all-orders section 1401 can display orders 904 made by the buyer from different vendor's on MRO website 304. In one embodiment, orders 904 on buyer's account can comprise order information that can include but is not limited to vendor information, date and/or time order was made, ordered item, number of items ordered, amount of each item ordered, total amount of ordered items, shipping fee, etc. Ordered section 902 can comprise list of active orders purchased by the buyer. As such, orders that are pending for approval can be listed under ordered section 902. Completed-order section 903 can comprise list of orders paid and claimed by the buyers.

Figure 15:
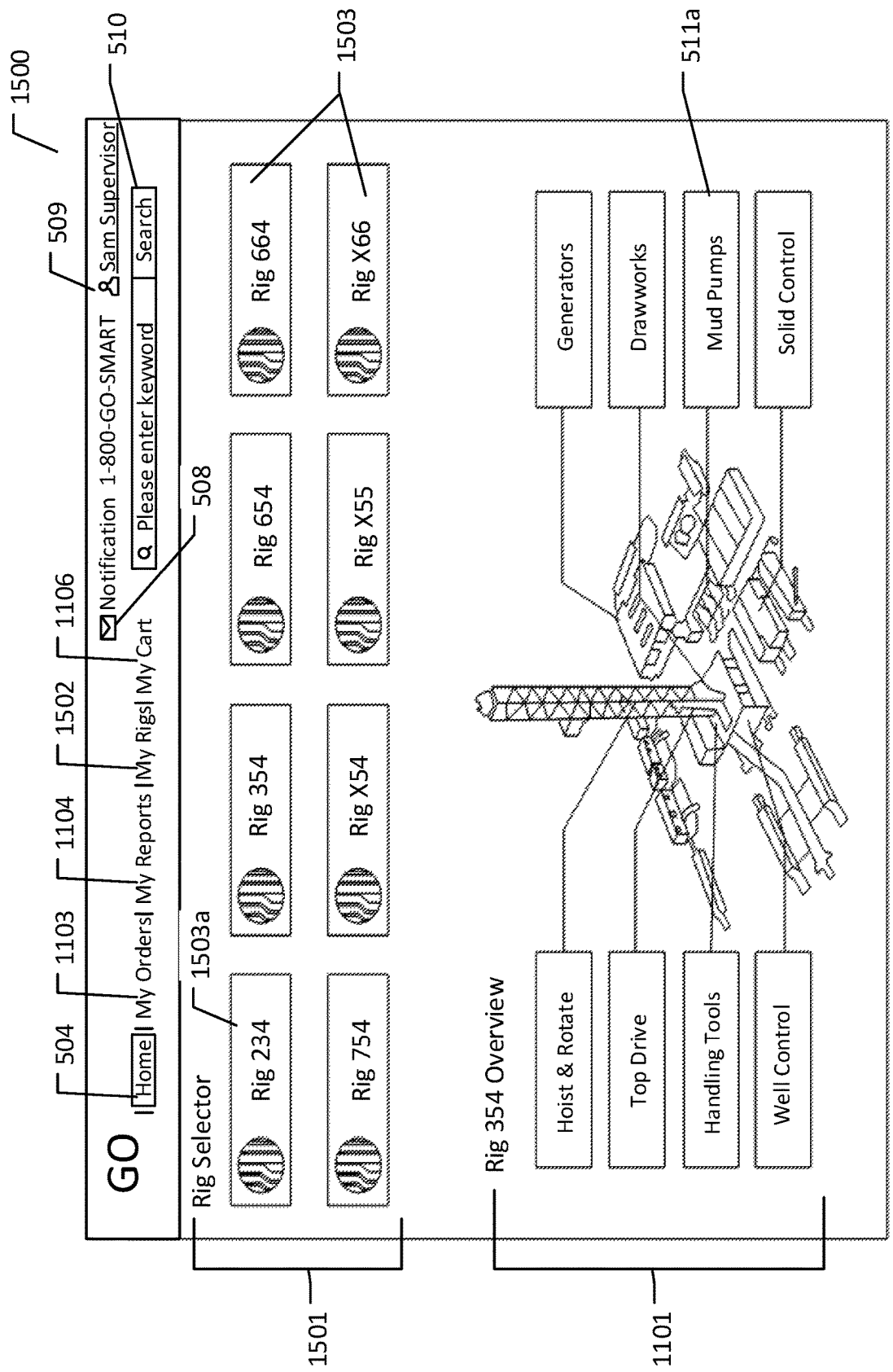
FIG. 15 illustrates a superintendent home screen.

FIG. 15 illustrates a superintendent home screen 1500. In this embodiment, a buyer with superintendent account 406 can login to MRO website 304 to access superintendent home screen 1100. In one embodiment, superintendent home screen 1100 can comprise navigation bar 501, a rig selector section 1501, and rig overview section 1102. In this embodiment, navigation bar 501 can comprise home widget 504, buyer's-my-orders widget 1103, buyer's-my-reports widget 1104, notifications widget 508, my-account widget 509, a superintendent's my-rigs widget 1502, and buyer's-my-cart widget 1106. Rig selector section 1501 on superintendent home screen 1100 can display list of one or more rigs 1503. Rigs 1503 can be different types or models of drilling rig such as rig 234, rig 354, rig 654, rig 664, rig 754, rig x54, rig x55, and/or rig x66 that can be managed and monitored by a supervisor using superintendent account 406. In this embodiment, rig overview section 1101 can display first depiction 1108a of a specific rig 1503a that was selected under rig selector section 1501. In such embodiment, the supervisor can place an order for a specific model and parts of rig 1503 by selecting the type of rig 1503 under rig selector section 1501 and by selecting one of rig parts 511 under rig overview section 1101. As an example embodiment shown in FIG. 15, when supervisor selects "rig 234" 1503a under rig selector section 1501, rig overview section 1101 can display first depiction 1108a of "rig 234" 1503a that can comprise rig parts 511 such as "hoist & rotate", "top drive", "handling tools", "well control", "generators", "draw works", "mud pumps" 511a, and "solid control". Similar with tool pusher account 405, superintendent account 406 can also purchase products 212 on through superintendent home screen 1500. In such embodiment, supervisor can purchase products 212 through rig overview section 1101. As such, supervisor with superintendent account 406 can go through the same process with tool pusher account 405 of selecting specific rig part 511a under rig overview section 1101 and navigate through depictions 1108 to select the parts or other components 603.

Figure 16:
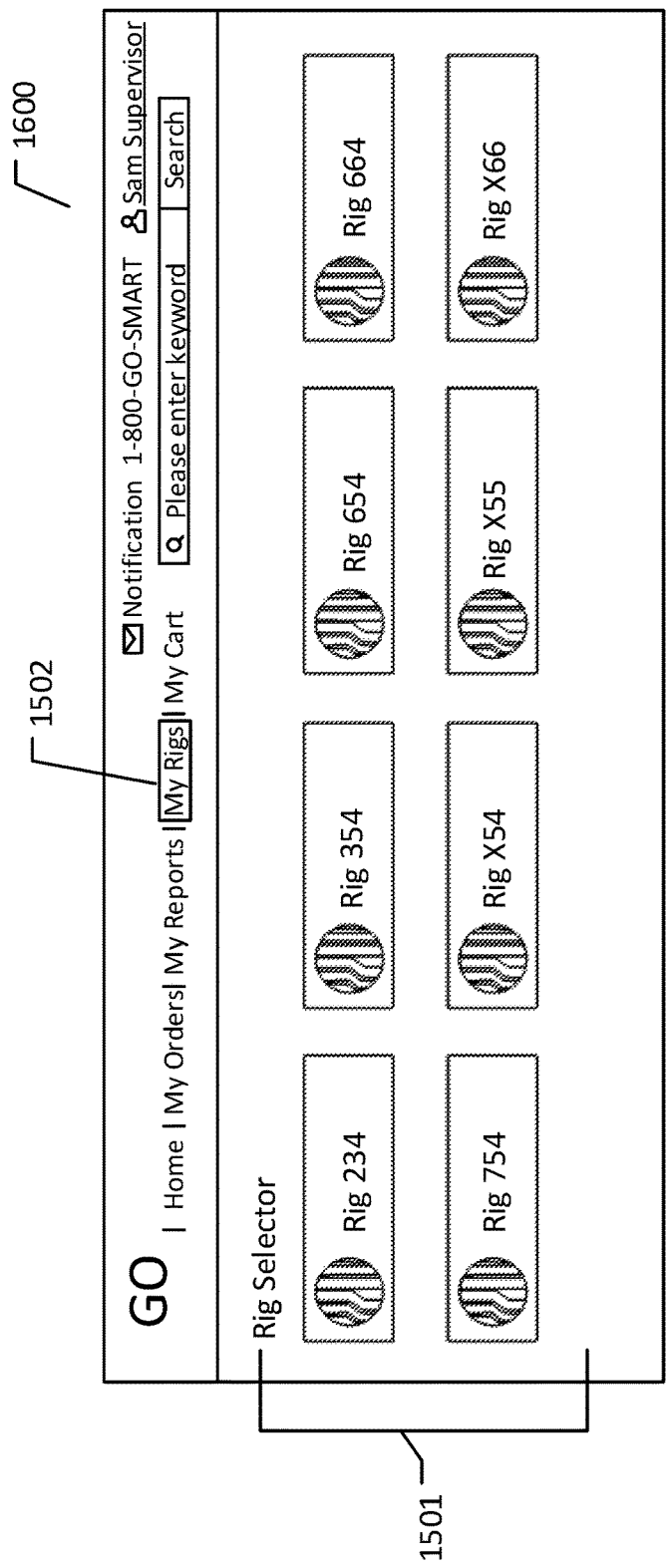
FIG. 16 illustrates a superintendent my-rigs screen.

FIG. 16 illustrates a superintendent my-rigs screen 1600. Clicking superintendent's my-rigs widget 1502 can display, superintendent my-rigs screen 1600. In one embodiment, my-rig screen 1300 can display rig selector section 1501. Similar to superintendent home screen 1500, my-rigs screen 1500 can allow supervisor to purchase products 212 on MRO website 304. As such, supervisor can select one of rig 1503 under rig selector screen section 1501 and in turn, rig overview section 1101 can display first depiction 1108a of the selected rig.

FIG. 17 illustrates a buyer's my-reports screen 1700. Buyers can access buyer's-my-reports screen 1700 by clicking buyer's-my-reports widget 1104 on navigation bar 501. In one embodiment, buyer's-my-reports screen 1700 can display an overview of orders 904 purchased by the buyer through MRO website 304. In an embodiment wherein the buyer can have a superintendent account 406, the buyer can view purchases made by tool pushers that are under the supervisor's supervision. In another embodiment wherein the buyer can have tool pusher account 405, the buyer can only view purchases that the user made on his tool pusher account 405.

Figure 18:
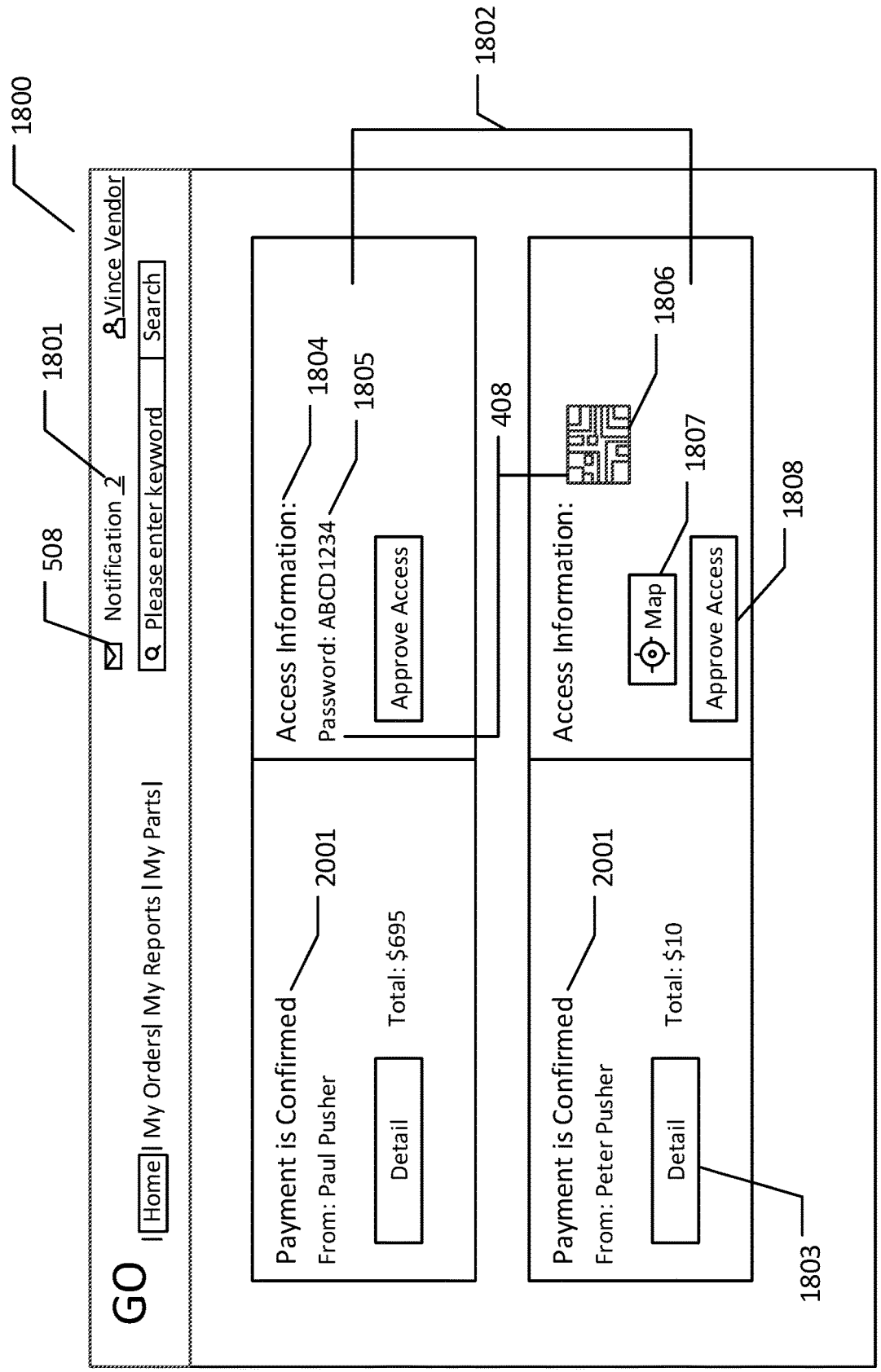
FIG. 18 illustrates a supervisor notifications alert screen.

FIG. 18 illustrates vendor's notifications alert screen 1800. A vendor can receive an alert notification 1801 each time an order is made for any of products 212 associated with vendor's account 404. In one embodiment, vendor's notification alert screen 1800 can comprise one or more sales confirmation 1802. Each sales confirmation 1802 can comprise a detail widget 1803, and access information 1804. In one embodiment, detail widget 1803 when clicked can allow the vendor to view order details 1204, and payment details of the specific buyer who purchased the vendor's products 212. In one embodiment, access information 1804 can comprise access key 408. Access key 408 can be automatically generated for each sales confirmation 1802. In one embodiment, access key 408 can be a password 1805. In another embodiment, access key 408 can be a barcode 1806. Further in one embodiment, access information 1804 can comprise a smart box map 1807 and an approve access widget 1808.

In such embodiments, clicking approve access widget 1808 can allow MRO website 304 to send access information 1804 to the buyer who made the purchase. The buyer who made the purchase can then receive alert notification 1801 that comprises access information 1804. As such, access information 1804 can provide the buyer the information needed to retrieve the buyer's purchased products.

Figure 19:
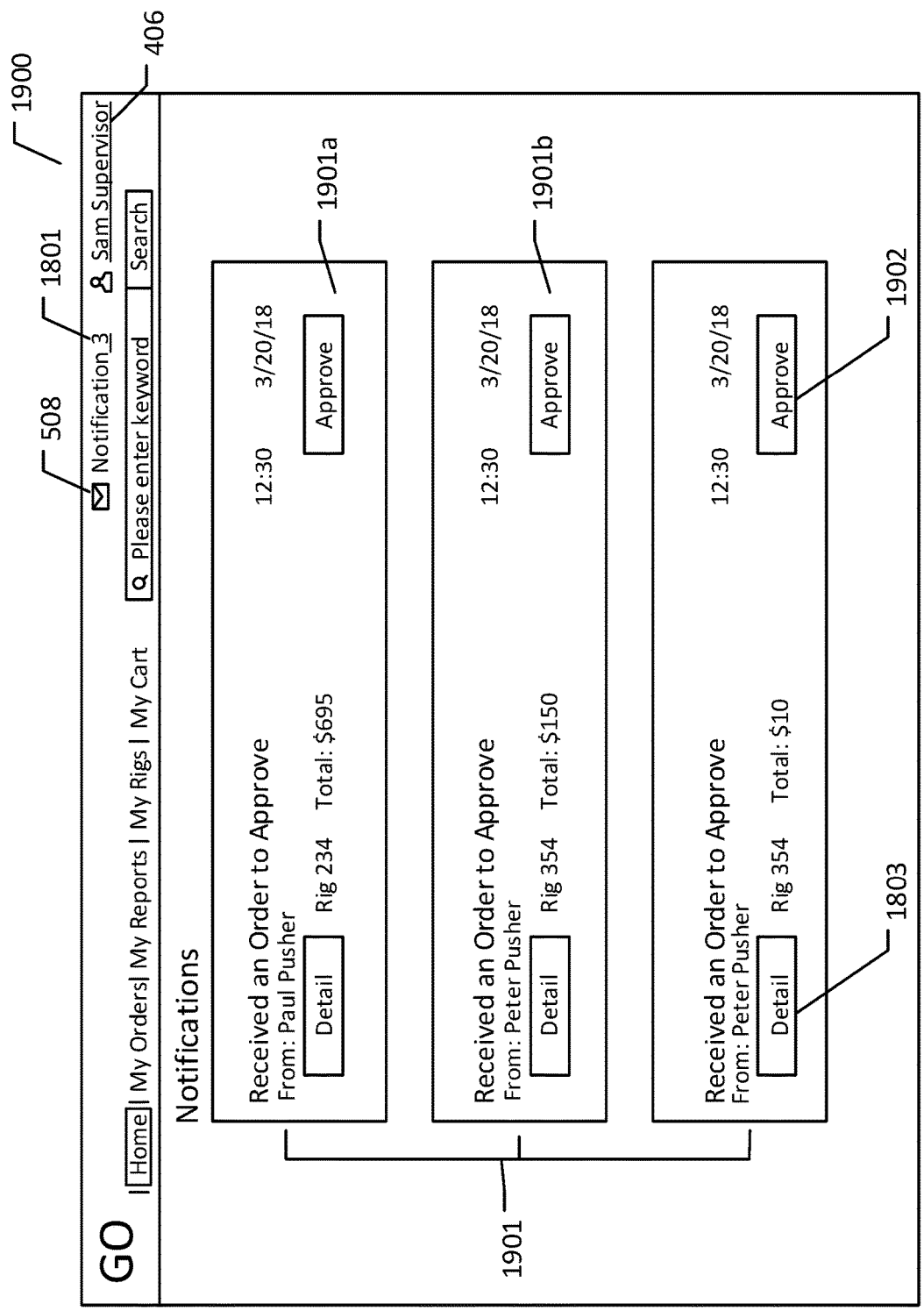
FIG. 19 illustrates a tool pusher notifications alert screen.

FIG. 19 illustrates supervisor's notifications alert screen 1900. In one embodiment, a supervisor can receive alert notification 1801 on superintendent account 406 when each tool pushers assigned under the supervisor have placed an order on MRO website 304. In another embodiment, the supervisor can receive alert notification 1801 when an order purchased by the superintendent was approved by the vendor. In one embodiment, supervisor's notifications alert screen 1800 can display one or more order requests 1901.

In an embodiment wherein alert notification 1801 can be from tool pushers, order requests 1901 can comprise detail widget 1803. Clicking detail widget 1803 can allow the superintendent to view order details 1204 made by the tool pusher. In one embodiment, clicking detail widget 1803 can display completed-order page 1209 associated with the purchase made by the buyer. As an example, clicking detail widget 1803 can display order details 1204 such as products 212 ordered by the buyer, vendor of products 212 purchased, total amount of purchased products 212, account buyer detail, etc. Further as an example embodiment, "Paul Pusher" with tool pusher account 405 and assigned with "rig 234" can place an order through MRO website 304. The user "Sam Supervisor" that can be assigned to "Paul Pusher" can then receive a first order request 1901a on the supervisor's superintendent account 406. Furthermore, "Peter Pusher" with another tool pusher account 405 and assigned to drilling rig "354" who reports to the same supervisor "Sam Supervisor" can also place an order for products 212 using MRO website 304. As such, "Sam Supervisor" can receive a second order request 1901b from "Peter Pusher" on superintendent account 406. In this example embodiment, "Sam Supervisor" can choose to approve or decline each order request 1901. In one embodiment, approving order 1901 request can be related to purchasing products 212 associated with order request 1901. As another example embodiment, when the supervisor clicks on an approve widget 1902 for the order made by "Paul Pusher". The vendor whose vendor identifier 409 can be associated with products 212 being purchased can receive alert notification 1801 on his vendor account 404. At the same time, the tool pusher "Paul Pusher" who placed the order that was approved by "Sam Supervisor" can receive alert notification 1801 on his tool pusher account 405. In another embodiment, tool pushers can also receive alert notification 1801 when the supervisor declines order request 1901.

Figure 20:
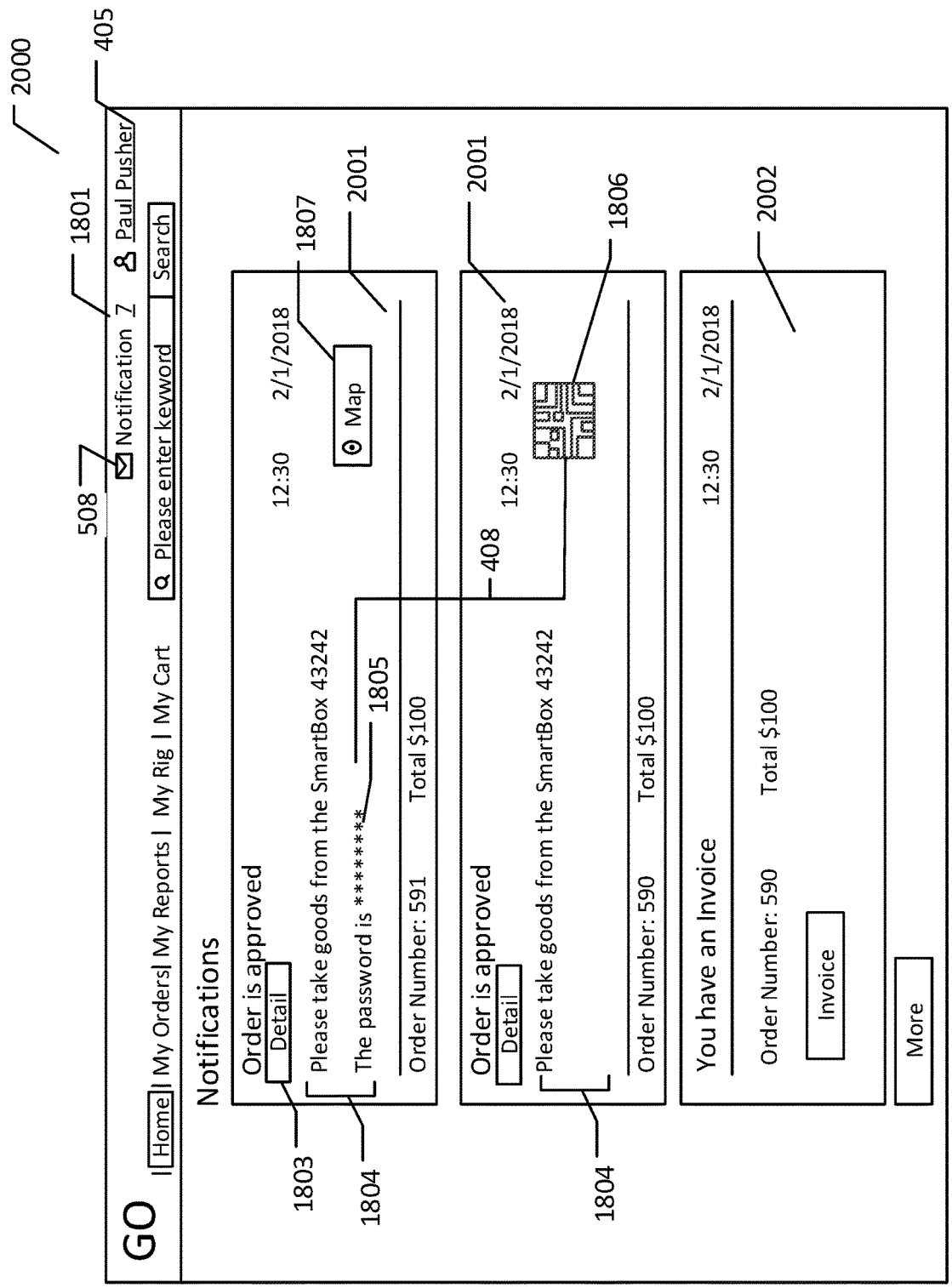
FIG. 20 illustrates vendor's notifications alert.

FIG. 20 illustrates tool pusher's notifications alert screen 2000. In one embodiment, notifications alert screen 2000 for tool pusher's account 404 can display one or more order status notifications, and one or more order invoice 2002. In such embodiment, tool pusher can receive alert notification 1801 whenever a supervisor approves or declines the tool pusher's order request 1901. In an embodiment wherein ordered products 212 can be approved, an approved order notification 2001 can be displayed. In one embodiment, each approved order notification 2001 can comprise and access information 1804 from the vendor of products 212 purchased.

In an embodiment wherein access information 1804 comprises smart box map 1807, smart box map 1807 can display a map where smart box control system 101 containing ordered products 212 can be located. In this embodiment, server 102 can communicate with each smart box control system 101 and receive the exact location of each smart box 200 through GPS receiver 204. In such embodiment, smart box map 1807 can display the location of smart box control system 101 that can be associated to smart box identifier 208 that contains purchased products 212. In an embodiment wherein access key 408 can be password 1904, access key 408 provided on access information 2002, can be entered or keyed-in through key pad 214 on the specified smart box control system 101 to allow the smart box control system 101 to release the purchased products 212. In an embodiment wherein access key 408 can be bar code 1905, access key 408 can be scanned through electronic reader 205 for smart box control system 101 to release the purchased products 212. Further in one embodiment, order invoice 2002 can be a request payment notification to tool pusher from the vendor in order to complete the order transaction.

FIG. 21 illustrates an exemplary method for providing an MRO solution for drilling rig sites. A user can first login on an MRO website 304 to be able to provide rig parts to other users, and/or purchase rig parts of a rig 1503. In an embodiment, wherein the user would want to provide rig parts to other users on MRO website 304, the user can register as vendor account 404 on MRO web site 304. In an embodiment, wherein the user can be a supervisor of a rig, the user can then register as superintendent account 406 on MRO website 304. In an embodiment wherein the user can be a tool pusher, the user can then register through MRO website 304 by selecting tool pusher account 405. Moreover in one embodiment, during the registration the tool pusher can enter the name of his supervisor before registering on the website. In another embodiment, the tool pusher can enter superintendent identifier 406a to link the tool pusher's account with his supervisor. In such embodiments, the tool pusher can link his account with his supervisor's account. This can allow the supervisor to monitor orders 904 made by the tool pusher. Further, after the user logs into MRO website 304, the home screen of MRO website 304 can provide a graphical user interface (GUI) to the user. The GUI can comprise a plurality of depictions 1108 of rig 1503. In one embodiment, each depiction from the plurality of depictions 1108 can comprise one or more clickable rig parts 511, as shown in FIG. 11A. In such embodiment, one depiction of the plurality of depictions 1108 can be an image of rig 1503 with clickable rig parts 511. Each of the clickable rig parts 511 can also be linked to a further depiction of the plurality of depictions 1108. As such, clicking one of the clickable rig parts 511 such as "Mud Pumps 511a", can display one of the plurality of depiction 1108 of "Mud Pumps (511a)". As an example shown in FIG. 11B, selecting clickable rig parts 511 such as "Mud Pumps (511a)" can display another depiction of "Mud Pumps (511a)", which displays other clickable rig parts 511, such as P. Dampener (603a), Gear End (603b), Crosshead (603c), "Fluid End (603d)", and "Expendables (603e)". In another embodiment, each of the clickable rig parts 511 can be linked to a plurality of products 212, which can be shown in FIG. 11C. In such embodiment, clicking one of clickable rig parts 511 such as "Fluid End (603d)" can display expanded view of a fluid end wherein each products 212 of fluid end 603d can be selected and purchased. In an embodiment wherein the user wants to buy a specific rig part from MRO website 304, the user can access the home screen and navigate through clickable rig parts 511 to select a purchasable component 603. After selecting one or more purchasable components 603 from one or more vendor's accounts 404, the user can add the selected products 212 to his cart and place an order 904. In an example embodiment wherein the buyer "Paul Pusher" can be using a tool pusher account 405, the tool pusher's supervisor "Sam Supervisor" can receive an alert notification 1801. "Sam supervisor" can then check his alert notification 1801 to view one or more order requests 1901. "Sam supervisor" can then approve order request 1901 from "Paul Pusher". Once approved, the vendor "Vince Vendor", who can be linked to products 212 ordered by "Paul Pusher", can then receive alert notification 1801 from "Paul Pusher". Clicking alert notification 1801 on vendor's account 404 can then display sales confirmation 1802. Each sales confirmation 1802 can comprise access information 1804. Thus, when "Vince Vendor" approves sales confirmation 1802 from "Paul Pusher", "Paul Pusher" can receive alert notification 1801 on his tool pusher's account 405 that his order was approved. "Paul Pusher" can then access alert notification 1801 on his tool pusher's account 405 to view one or more approved order notifications 2001. "Paul Pusher" can then view approved order notification 2001 that was approved by "Sam Supervisor" and "Vince Vendor". In one embodiment, approved order notification 2001 can comprise access information 1804, and smart box map 1807 that can allow "Paul Pusher" to locate and retrieve his order 904.

FIG. 22 illustrates an exemplary method for using a smart box control system 101. In an embodiment wherein a buyer placed an order in MRO website 304, the buyer can retrieve the ordered product from one of smart box control systems 101. In this embodiment, once a vendor and/or a superintendent has approved order 904 made by a buyer, the buyer can use access information 1804, such as map 1807 and access key 408 to locate and retrieve products 212 that the buyer ordered. In one embodiment, map 1807 on access information 1804 can provide the location of the specific smart box control system 101 that contains products 212 associated with order 904 made by the buyer. Once smart box control system 101 is located, the buyer can supply access key 408 to be granted an access to products 212. In an embodiment wherein access key 408 can be password 1805, the buyer can key-in password 1808 on access control system 211 using keypad 214. In another embodiment wherein access key 408 can be a barcode 1806, the buyer can scan barcode 1806 on access control system 211 using electronic reader 205. Further in another embodiment wherein electronic reader 205 can be biometric reader, the buyer can provide biometric data on electronic reader 205. In return, control system 101 can compare access key 408 entered on access control system 211 with access control list 402 from server 102. Concurrently, control system 101 can determine user account 401 associated with access key 408 entered. Once access key 408 matches with one of the access keys within access control list 402 and user account 401 has been determined, control system 101 can send signal to access control system 211 to grant access to the buyer. As such, access control system 211 can allow door 210 be opened. Then, product 212 associated with order 904 purchased by the buyer can be directed out of door 210. RFID reader 215 within smart box 200 can maintain contact with each RFID tag 213 attached to each product 212. As such, when one of RFID tag 213 attached to one of a plurality of products 212 go out of range of RFID reader 215, control system 101 can send instructions to server 102 to bill user account 401 associated with access key 408 entered on access control system 211. Once user account 401 is billed, order 904 associated to billed product 212 can be listed under completed-order section 903 of the associated buyer's account and the associated vendor's account.

In another embodiment a vendor can add and/or restock products 212 on smart box control system 101. In such embodiment, vendor can supply access key 408 to access smart box 200. In one embodiment, vendor can supply his biometric data by scanning the vendor's fingerprint, or face through electronic reader 205. In return, control system 101 can match access key 408 with vendor account 404 of the vendor. Once access key 408 is verified, control system 101 can send signal to access control system 211 to open door 210 of smart box 200. The vendor can then put in new product 212 into smart box 200. As such, control system 101 can instruct RFID reader 215 to initiate contact with new RFID tag 213 associated with new product 212 brought into smart box 200. Upon initiating contact with new RFID tag 213, control system 101 can then direct server processor 301 to add new product 212 to an inventory of the associated vendor account 404. As such, control system 101 can send gathered product information 407 that was scanned from RFID tag 213 to server processor 301. As such, server processor 301 can instruct MRO website 304 to add new product 212 to vendor account 404 associated with the vendor that supplied access key 408.

Smart box memory 202 and server memory 302 is defined herein as including both volatile and nonvolatile memory and data storage components. Volatile components are those that do not retain data values upon loss of power. Nonvolatile components are those that retain data upon a loss of power. Thus, smart box memory 202 and server memory 302 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, smart box processor 201 and server processor 301 can represent multiple smart box processor 201 and server processor 301, while smart box memory 202 and server memory 302 can represent multiple smart box memory 202 and server memory 302 that operate in parallel processing circuits, respectively. In such a case, first local interface 303 can be an appropriate network, including network 104 that facilitates communication between any two of the multiple smart box processor 201 and server processor 301, between any smart box processors 201 and server processors 301 and any of the smart box memories 202 and server memories 302, or between any two of the smart box memories 202 and server memories 302, etc. First local interface 303 can comprise additional systems designed to coordinate this communication, including, for example, performing load balancing. Smart box processors 201 and server processors 301 can be of electrical or of some other available construction.

Although smart box application 206 and MRO website 304, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 21 show the functionality and operation of an implementation of portions of smart box application 206 and MRO website 304. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as smart box processors 201 and server processors 301 in a computer system or other system. The machine code can be converted from the source code, etc. If embodied in hardware, each block can represent a circuit or a number of interconnected circuits to implement the specified logical function(s).

Although the flowcharts of FIG. 21 show a specific order of execution, it is understood that the order of execution can differ from that which is depicted. For example, the order of execution of two or more blocks can be scrambled relative to the order shown. Also, two or more blocks shown in succession in FIG. 21 can be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including smart box application 206 and MRO website 304, that comprises software or code can be embodied in any computer-readable storage medium for use by or in connection with an instruction execution system such as, for example, smart box processors 201 and server processors 301 in a computer system or other system. In this sense, the logic can comprise, for example, statements including instructions and declarations that can be fetched from the computer-readable storage medium and executed by the instruction execution system.

In the context of the present disclosure, a "computer-readable storage medium" can be any medium that can contain, store, or maintain the logic or application described herein for use by or in connection with the instruction execution system. The computer-readable storage medium can comprise any one of many physical media such as, for example, electronic, magnetic, optical, electromagnetic, infrared, or semiconductor media. More specific examples of a suitable computer-readable storage medium would include, but are not limited to, magnetic tapes, magnetic floppy diskettes, magnetic hard drives, memory cards, solid-state drives, USB flash drives, or optical discs. Also, the computer-readable storage medium can be a random access memory (RAM) including, for example, static random access memory (SRAM) and dynamic random access memory (DRAM), or magnetic random access memory (MRAM). In addition, the computer-readable storage medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A smart box comprising
a box capable of housing a plurality of purchasable products;
a radio-frequency identification (RFID) reader capable of reading a plurality of RFID tags; and
an access control system; and
a smart box control system comprising;
  a smart box memory comprising a smart box application; and
  a smart box processor that according to instructions from said smart box application
    grants access to a buyer upon said buyer supplying an access key to said access control system;
    maintains contact with each of said plurality of RFID tags within said box using said RFID reader; and
    directs a purchasable product of said plurality of purchasable products to be billed to a user account associated with said buyer upon losing contact with an RFID tag of said plurality of RFID tags associated with said purchasable product.

2. The smart box of claim 1 wherein said box is metal.

3. The smart box of claim 2 wherein a door of said box is metal.

4. The smart box of claim 1 wherein said access control system comprises a barcode reader, further wherein said access key is a bar code readable by said bar code reader.

5. The smart box of claim 1 wherein said access control system comprises a biometric reader, further wherein said access key is biometric data readable by said bar code reader.

6. The smart box of claim 1 further comprising a GPS device attached to said box and connected to said smart box control system.

7. The smart box of claim 1 wherein said processor further
grants access to a vendor upon said vendor supplying an access key to said access control system;
initiates contact with a new RFID tag associated with a new product brought into said box by said vendor; and
directs said new product to be added to an inventory of a vendor account associated with said vendor upon initiating contact with said new RFID tag.

8. A method of using a smart box comprising
granting access to a buyer to a smart box upon said buyer supplying an access key to an access control system, said smart box comprising
  a box capable of housing a plurality of purchasable products;
  a radio-frequency identification (RFID) reader capable of reading a plurality of RFID tags;
  an access control system;
  a smart box memory comprising a smart box application; and
  a smart box processor;
maintaining contact with each of said plurality of RFID tags within said box using said RFID reader; and
directing a purchasable product of said plurality of purchasable products to be billed to a user account associated with said buyer upon losing contact with one of said RFID tag associated with said purchasable product.

9. The method of claim 8 wherein said box is metal.

10. The method of claim 9 wherein a door of said box is metal.

11. The method of claim 8 wherein said access control system comprises a barcode reader, further wherein said access key is a bar code readable by said bar code reader.

12. The method of claim 8 wherein said access control system comprises a biometric reader, further wherein said access key is biometric data readable by said bar code reader.

13. The method of claim 8 further comprising a GPS device attached to said box and connected to said smart box controller.

14. The method of claim 8 further comprising the steps granting access to a vendor upon said vendor supplying an access key to said access control system;

initiating contact with a new RFID tag associated with a new product brought into said box by said vendor; and directing said new product to be added to an inventory of a vendor account associated with said vendor upon initiating contact with said new RFID tag.

15. A computer readable storage medium having data stored therein representing software executable by a computer, the software including instructions to provide a maintenance, repair, and operating supplies (MRO) solution for drilling rig sites comprising, the storage medium comprising instructions for:

granting access to a buyer to a smart box upon said buyer supplying an access key to an access control system, said smart box comprising a box capable of housing a plurality of purchasable products;

a radio-frequency identification (RFID) reader capable of reading a plurality of RFID tags;

an access control system;

a smart box memory comprising a smart box application; and a smart box processor;

maintaining contact with each of said plurality of RFID tags within said box using said RFID reader; and directing a purchasable product of said plurality of purchasable products to be billed to a user account associated with said buyer upon losing contact with one of said RFID tag associated with said purchasable product.

\* \* \* \* \*